US008504008B1

(12) United States Patent
Gossweiler, III et al.

(10) Patent No.: US 8,504,008 B1
(45) Date of Patent: Aug. 6, 2013

(54) VIRTUAL CONTROL PANELS USING SHORT-RANGE COMMUNICATION

(75) Inventors: Richard Carl Gossweiler, III, Sunnyvale, CA (US); Colin Albright McDonough, Mountain View, CA (US); Roy Want, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/612,311

(22) Filed: Sep. 12, 2012

Related U.S. Application Data

(60) Provisional application No. 61/594,221, filed on Feb. 2, 2012.

(51) Int. Cl.
*H04M 3/00* (2006.01)

(52) U.S. Cl.
USPC .......................................... 455/420; 455/419

(58) Field of Classification Search
USPC .................................. 455/418–420
See application file for complete search history.

(56) References Cited

U.S. PATENT DOCUMENTS

| 7,145,454 | B2 | 12/2006 | Linjama et al. |
| 7,538,686 | B2 * | 5/2009 | Yeh et al. .................. 340/12.54 |
| 7,756,467 | B2 | 7/2010 | Bent et al. |
| 7,873,849 | B2 | 1/2011 | Mucignat et al. |
| 8,264,529 | B2 | 9/2012 | Goulart et al. |
| 2001/0049268 | A1 * | 12/2001 | Kobayashi ...................... 455/88 |
| 2003/0001018 | A1 | 1/2003 | Hussey et al. |
| 2003/0008692 | A1 | 1/2003 | Phelan |
| 2003/0046700 | A1 | 3/2003 | Wilcox et al. |
| 2003/0132974 | A1 | 7/2003 | Bodin |
| 2004/0116074 | A1 | 6/2004 | Fujii et al. |
| 2004/0146909 | A1 | 7/2004 | Duong et al. |
| 2004/0174400 | A1 | 9/2004 | Herigstad et al. |
| 2004/0194028 | A1 | 9/2004 | O'Brien |
| 2005/0030201 | A1 | 2/2005 | Bridgelall |
| 2005/0174324 | A1 | 8/2005 | Liberty et al. |
| 2006/0022800 | A1 | 2/2006 | Krishna et al. |
| 2006/0084409 | A1 * | 4/2006 | Ghadiali ....................... 455/352 |
| 2006/0092072 | A1 | 5/2006 | Steiner |
| 2006/0227365 | A1 | 10/2006 | Hohensee et al. |
| 2006/0237537 | A1 | 10/2006 | Empedocles et al. |
| 2006/0242607 | A1 | 10/2006 | Hudson |

(Continued)

OTHER PUBLICATIONS

Broll et al., "Mobile and Physical User Interfaces for NFC-based Mobile Interaction with Multiple Tags," MobileHCI' 10, Sep. 7-10, 2010, 10 pp.

(Continued)

*Primary Examiner* — Temica M Beamer
*Assistant Examiner* — Joel Ajayi
(74) *Attorney, Agent, or Firm* — Shumaker & Sieffert, P.A.

(57) ABSTRACT

In general, techniques and systems for controlling a parameter of a target device are described. In one example, a method includes obtaining, by a computing device, control information from an identification device located remote from a target device, wherein the control information is associated with the target device, and, responsive to obtaining the control information, displaying a control panel at a display of the computing device, wherein the control panel comprises at least one parameter that at least partially defines operation of the target device. The method may also include receiving, by the computing device, an adjustment to the at least one parameter of the control panel, and responsive to receiving the adjustment, transmitting adjustment information to a receiver associated with the target device, wherein the adjustment information is representative of the adjustment.

25 Claims, 13 Drawing Sheets

(56) References Cited

U.S. PATENT DOCUMENTS

| | | | |
|---|---|---|---|
| 2006/0261928 | A1 | 11/2006 | Solberg et al. |
| 2007/0109124 | A1 | 5/2007 | Park et al. |
| 2007/0124503 | A1 | 5/2007 | Ramos et al. |
| 2007/0145152 | A1 | 6/2007 | Jogand-Coulomb et al. |
| 2007/0176824 | A1 | 8/2007 | Stumbo et al. |
| 2007/0188444 | A1 | 8/2007 | Vale et al. |
| 2008/0021876 | A1 | 1/2008 | Ahern et al. |
| 2008/0076505 | A1 | 3/2008 | Nguyen et al. |
| 2008/0093447 | A1 | 4/2008 | Johnson et al. |
| 2008/0162141 | A1 | 7/2008 | Lortz |
| 2008/0262928 | A1 | 10/2008 | Michaelis |
| 2009/0037326 | A1 | 2/2009 | Chitti et al. |
| 2009/0044123 | A1 | 2/2009 | Tilton et al. |
| 2009/0303004 | A1 | 12/2009 | Tuttle |
| 2010/0081375 | A1 | 4/2010 | Rosenblatt et al. |
| 2010/0161410 | A1 | 6/2010 | Tulloch |
| 2010/0184372 | A1 | 7/2010 | Tabaaloute |
| 2010/0214398 | A1 | 8/2010 | Goulart et al. |
| 2010/0241494 | A1 | 9/2010 | Kumar et al. |
| 2010/0294840 | A1 | 11/2010 | Barry |
| 2011/0037609 | A1 | 2/2011 | Kim et al. |
| 2011/0083111 | A1 | 4/2011 | Forutanpour et al. |
| 2011/0095873 | A1 | 4/2011 | Pratt et al. |
| 2011/0102455 | A1 | 5/2011 | Temple |
| 2011/0106635 | A1 | 5/2011 | Khan et al. |
| 2011/0109546 | A1 | 5/2011 | Milne et al. |
| 2011/0185607 | A1 | 8/2011 | Forster et al. |
| 2011/0212688 | A1 | 9/2011 | Griffin et al. |
| 2011/0276511 | A1 | 11/2011 | Rosenberg |
| 2011/0320293 | A1 | 12/2011 | Khan |
| 2012/0029997 | A1 | 2/2012 | Khan et al. |
| 2012/0044059 | A1 | 2/2012 | Saros et al. |
| 2012/0045989 | A1 | 2/2012 | Suumaki et al. |
| 2012/0084302 | A1 | 4/2012 | Murdock et al. |
| 2012/0094596 | A1 | 4/2012 | Tysowski |
| 2012/0094597 | A1 | 4/2012 | Tysowski |
| 2012/0094598 | A1 | 4/2012 | Tysowski |
| 2012/0150601 | A1 | 6/2012 | Fisher |
| 2012/0167146 | A1 | 6/2012 | Incorvia |
| 2012/0198504 | A1 | 8/2012 | Tabaaloute |
| 2012/0239760 | A1 | 9/2012 | Sjarif et al. |
| 2012/0242481 | A1 | 9/2012 | Gernandt et al. |
| 2012/0242846 | A1 | 9/2012 | Iwase |
| 2012/0245990 | A1 | 9/2012 | Agarwal |
| 2012/0317194 | A1 | 12/2012 | Tian |

OTHER PUBLICATIONS

"Near Field Communication," found at http://acuitydesign.eu/near-field-communication.html, accessed on Jan. 20, 2012, 1 p.

Broll et al., "Dynamic NFC-Displays as a Prototyping Platform for Direct Mobile Interactions with Public Displays," UbiComp'10, Sep. 26-29, 2010, 4 pp.

Broll et al., Design and Evaluation of Techniques for Mobile Interaction with Dynamic NFC-Displays, TEI' 11, Jan. 22-26, 2011, Funchal, Portugal, 8 pp.

Pering et al., "Gesture Connect: Facilitating Tangible Interaction With a Flick of the Wrist," Proceedings of the 1st international conference on Tangible and embedded interaction, Feb. 2007, 4 pp.

"Cirque Innovative Touch Solutions," Glidepoint NFC™, found at http://www.cirque.com/technologies/glidepointnfc.aspx, accessed on Jan. 20, 2012, 2 pp.

Sanchez et al., "Touch & Control: Interacting with Services by Touching RFID Tags," Proceeding of IWRT, Dec. 2008, pp. 53-62.

"Future Forecasting: Near Field Communication (NFC) in mLearning," found at https://instructionaldesignfusions.wordpress.com/tag/nfc-tags/, Dec. 26, 2010, 9 pp.

"NFC Tags and QR Codes create Smart Signs & Smart Posters," found at http://www.redirectware.com/signs-posters.htm, accessed on Sep. 9, 2011, 2 pp.

"Mobile contactless services and NFC Smart Posters to change people's daily lives," by Fred Bear, Online-News-Today, found at http://nfcdata.com/blog/2011/02/18/mobile-contactless-services-and-nfc-smart-posters-to-change-people%e2%80%99s-daily-lives/, Feb. 18, 2011, 2 pp.

U.S. Appl. No. 13/611,983, by William Noah Schilit, filed Sep. 12, 2012.

U.S. Appl. No. 13/612,308, by William Noah Schilit, filed Sep. 12, 2012.

U.S. Appl. No. 13/612,169, by William Noah Schilit, filed Sep. 12, 2012.

U.S. Appl. No. 13/612,166, by Roy Want, filed Sep. 12, 2012.

U.S. Appl. No. 13/612,427, by Roy Want, filed Sep. 12, 2012.

U.S. Appl. No. 13/612,386, by Roy Want, filed Sep. 12, 2012.

Office Action from U.S. Appl. No. 13/611,983, dated Jan. 29, 2013, 13 pp.

Office Action from U.S. Appl. No. 13/612,308, dated Nov. 15, 2012, 22 pp.

Response to Office Action dated Nov. 15, 2012, from U.S. Appl. No. 13/612,308, filed Feb. 15, 2013, 12 pp.

Office Action from U.S. Appl. No. 13/612,169, dated Nov. 26, 2012, 12 pp.

Response to Office Action dated Nov. 26, 2012. from U.S. Appl. No. 13/612,169, filed Feb. 26, 2013, 12 pp.

Office Action from U.S. Appl. No. 13/612,427, dated Dec. 11, 2012, 13 pp.

* cited by examiner

US 8,504,008 B1

VIRTUAL CONTROL PANELS USING SHORT-RANGE COMMUNICATION

This application claims the benefit of U.S. Provisional Application No. 61/594,221, filed Feb. 2, 2012, the entire content of each of which is incorporated herein by reference.

TECHNICAL FIELD

This disclosure relates to controlling a parameter of a target device using a computing device.

BACKGROUND

A user may interact with applications executing on a computing device. For instance, a user may install, view, or delete an application on a computing device.

In some instances, a user may use a mobile computing device (e.g., mobile phone, tablet computer, smart phone, or the like) to communicate with other devices or systems. For instance, a user may transmit information from the mobile computing device to a remote computing device.

SUMMARY

In one example, a method includes obtaining, by a computing device, control information from an identification device located remote from a target device, wherein the control information is associated with the target device, responsive to obtaining the control information, displaying a control panel at a display of the computing device, wherein the control panel comprises at least one parameter that at least partially defines operation of the target device, receiving, by the computing device, an adjustment to the at least one parameter of the control panel, and responsive to receiving the adjustment, transmitting adjustment information to a receiver associated with the target device, wherein the adjustment information is representative of the adjustment.

In another example, a computer-readable storage medium is encoded with instructions that cause one or more processors of a computing device to perform operations including obtaining control information from an identification device located remote from a target device, wherein the control information is associated with the target device, responsive to obtaining the control information, displaying a control panel at a display of the computing device, wherein the control panel comprises at least one parameter that at least partially defines operation of the target device, receiving an adjustment to the at least one parameter of the control panel, and responsive to receiving the adjustment, transmitting adjustment information to a receiver associated with the target device, wherein the adjustment information is representative of the adjustment.

In another example, a mobile computing device includes a near-field communication module configured to obtain control information from an identification device located remote from a target device, wherein the control information is associated with the target device, and a processor. The processor is configured to, responsive to obtaining the control information, display a control panel at a display of the mobile computing device, wherein the control panel comprises at least one parameter that at least partially defines operation of the target device, receive an adjustment to the at least one parameter of the control panel, and responsive to receiving the adjustment, transmit adjustment information to a receiver associated with the target device, wherein the adjustment information is representative of the adjustment.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
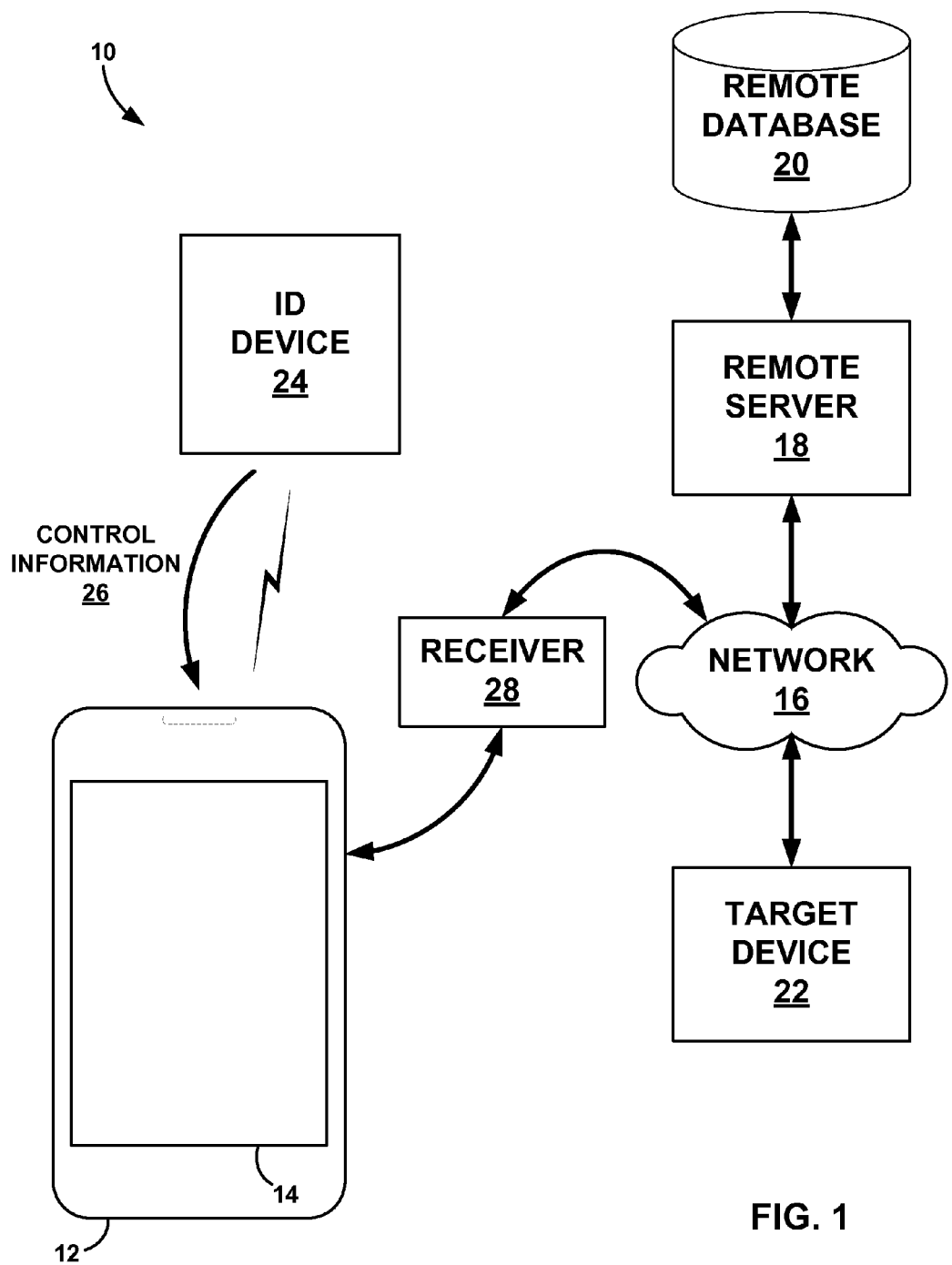
FIG. 1 is a conceptual diagram illustrating an example computing device that is configured to receive control information obtained from an identification device to control a target device, in accordance with one or more aspects of the present disclosure.

In general, this disclosure is directed to techniques for controlling a target device in response to obtaining control information from an identification device. Typically, a target device (e.g., an entertainment system or room lighting control system) may be controlled using one or more controllers (e.g., a dial, slider, or button coupled to the target device or a wireless remote control) that adjust one or more parameters of the target device. However, wired controllers may require wires to be mounted between the controller and the target device and wireless controllers still require a power cable or battery power source. Universal wireless remote controls may also require complicated initial configuration and setup steps that may be manually performed by a user or performed using another device (e.g., a computing device). Due to these example constraints, conventional controllers may be inconvenient or impossible to install at some desired locations within a room, building, or other space.

Techniques of this disclosure may, in various instances, enable a computing device (e.g., a mobile device) to obtain information from an identification device (e.g., a passive near-field communication device or an optical barcode) to control a parameter of a target device. The parameter may define at least a portion of the operation of the target device. The identification device may be located remote from the target device. For example the identification device may be located on or within a wall, table, chair, window, or any other surface desired by the user. Although not necessary, an information device may be labeled to visually identify the target device and/or the control parameter to allow the user to approach the desired identification device. In response to obtaining control information from the identification device, the computing device may automatically display a control panel (e.g., a virtual control panel) associated with the target device. The control panel may include one or more input mechanisms for receiving an adjustment to at least one parameter of the target device. In this manner, the user may not need to navigate an operating system or multiple menus before being able to view the control panel. In addition, the control panel may provide additional control functionality than would be otherwise available with a hardwired control.

The computing device may display information associated with multiple target devices. For example, the computing device may display two or more control panels stacked or otherwise positioned together for controlling their respective target devices. For example, the computing device may display one control panel in response to obtaining control information from one identification device. In response to obtaining additional control information from another identification device, the computing device may stack a second control panel with the first control panel. Alternatively, the computing device may replace the first control panel with the second control panel or merge the parameters of both control panels into a single control panel with one or more common parameters.

In addition, the computing device may use one or more sensors to detect movement of the computing device. The computing device may utilize this movement to control one or more aspects of the control panel. For example, the computing device may scroll to different portions of a control panel larger than the computing device display in response to movement of the computing device. In other examples, the computing device may receive an adjustment to a parameter of the control panel in the form of the detected movement of the computing device. In some examples, the computing device may also configure parameters of the control panel based on a set of user preferences. In this manner, the computing device may customize the control environment available to the user for controlling one or more target devices.

FIG. 1 is a conceptual diagram illustrating an example computing device 12 that is configured to receive control information 26 obtained from an identification device 24 to control a target device 22. As shown in FIG. 1, system 10 includes computing device 12, target device 22, identification device 24, receiver 28, network 16, remote server 18, and remote database 20. Computing device 12, in some examples, is or is a part of a portable computing device (e.g., a mobile phone, a smart phone, a personal digital assistant (PDA), a netbook, a notebook, an e-reader, or a tablet device). In other examples, computing device 12 may be at least a part of a digital camera, a music player, or any other device that a user may carry or move between different locations. Computing device 12 may also connect to network 16 (a wired or wireless network) via receiver 28 (e.g., a wireless access point). In other examples, receiver 28 may be directly coupled to target device 22 without network 16 (e.g., infrared communication, radio frequency communication, etc.).

Computing device 12 may include a short-range communication module (not shown) capable of initiating wireless communication with identification device 24, over a relatively short distance. For example, this short distance may be less than approximately 10 meters, less than 1 meter, less than 10 centimeters, or even less than 2.5 centimeters. In some examples, computing device 12 may initiate communication with identification device 24 when computing device 12 is within 5 centimeters of the identification device. In this example, a user may place computing device 12 directly over or even touching identification device 24 such that computing device 12 may communicate with the identification device at that particular location of computing device 12. The short distance required for short-range communication may be selected based on the application of identification devices 24. In other words, shorter distances may be used when identification devices are closer together to so that each of the identification devices may be uniquely distinguishable from each other. In addition, the user may benefit from being aware that control information 26 may be obtained from an identification device 24. For example, computing device 12 may request that the user confirm that short-range communication is to occur (e.g., receive a confirmation input).

In some examples, computing device 12 may be moved from identification device 24 to communicate with a different identification device that may represent a different parameter for target device 22. Although identification device 24 is generally described herein as a short-range communication device (e.g., a near-field communication device), identification device 24 may provide control information 26 in alternative mediums. For example, identification device 24 may be a visual indicator (e.g., an optical tag or optical barcode) such as a bar code, a Quick Response (QR) code, or a circular bar code (e.g., a ShotCode). Alternative optical tags may include a DataMatrix tag, an Aztec code, an EZcode, a High Capacity Color Barcode (HCCB), or a MaxiCode. Computing device 12 may then utilize a camera or other such sensor to obtain control information 26 from identification device 24 in the form of a graphic or other visual indicator.

As shown in FIG. 1, identification device 24 may be any device that is placed in a location at which computing device 12 may obtain control information 26. For example, identification device 24 may be placed, adhered, or otherwise attached to a wall, window, furniture, or device associated with target device 22. Identification device 24 may have information associated with the parameter and/or target device 22 printed on a surface of the identification device. Alternatively, information may be printed on a sticker or other media that is attached to identification device 24. Although identification device 24 may be provided alone, identification device 24 may be provided with one or more additional identification devices that each provide control information regarding different parameters that control target device 22. Since each identification device 24 may be relatively simple and configured to communicate with any number of computing devices, computing device 12 may be capable of establishing communication with hundreds, thousands, or even millions of different identification devices. In addition, identification device 24 may provide control information 26 to two or more different computing devices 12.

As described herein, identification device 24 may be capable of short-range communication. One example of short-range communication is near-field communication (NFC). NFC communication can occur between two devices in different modes. For example, computing device 12 may operate in at least two different modes to communicate with identification device 24 using NFC. For example, computing device 12 and identification device 24 may be configured to operate in a passive mode and an active mode of operation. In an active mode of operation, computing device 12 may generate a first alternating magnetic field that is received by one of identification device 24 in physical proximity to computing device 12. In response, identification device 24 may generate a second alternating magnetic field that is received by computing device 12. In this way, data may be communicated between computing device 12 and identification device 24 such as using peer-to-peer communication. In the active mode, computing device 12 may also power or activate a passive device to retrieve data from the passive device, as further described below. In this manner, identification device 24 may include passive near-field communication hardware.

In a passive mode of operation, load modulation techniques may be employed to facilitate data communication between computing device 12 and identification device 24. In a passive mode, identification device 24 does not actively generate an alternating magnetic field in response to the alternating magnetic field of computing device 12, but only as a result of the induced voltage and applied load at the receiver or antenna of identification device 24. Instead, identification device 24 may include electrical hardware (e.g., an NFC module) that generates a change in impedance in response to the alternating magnetic field generated by computing device 12. For example, computing device 12 may generate an alternating magnetic field that is received by identification device 24. Electrical hardware in identification device 24 may generate a change in impedance in response to the alternating magnetic field. The change in impedance may be detected by the NFC module of computing device 12. In this way, load modulation techniques may be used by computing device 12 to obtain control information 26 from each of identification device 24. In other words, computing device 12 may obtain control information 26 from identification device 24, but identification device 24 would not receive any data from computing device 12 in the passive mode. Other well-known modulation techniques including phase modulation and/or amplitude modulation of the applied signal resulting from load modulation may also be employed to facilitate data communication between computing device 12 and identification device 24 in other examples.

Generally, identification device 24 may operate in passive mode for NFC communication. In passive mode, identification device 24 may be referred to as NFC tags or NFC targets. In other words, computing device 12 may include active NFC hardware and identification device 24 may include passive NFC hardware. Since a passive identification device 24 do not need a dedicated power supply, identification device 24 may be placed in a variety of locations, on any surface, or even as part of smaller items. For example, identification device 24 may be embodied as a sticker or adhesive tag that is placed on the wall of a room, a window, a countertop, furniture, or any other surface. In addition, identification device 24 may also be placed behind certain surfaces in some examples. Passive identification device 24 may also be less expensive and more difficult to corrupt with computing device 12. In this manner, identification device 24 may include electrical hardware that generates a change in impedance in response to an alternating magnetic field. However, identification device 24 may be another computing device in other examples. For example, identification device 24 may each be a computing device that operates in a passive NFC mode and/or an active NFC mode. In other words, identification device 24 may include active NFC hardware in other examples. This active NFC hardware may be configured to emulate passive NFC hardware or participate in active near-field communication.

In an example of a passive identification device 24, identification device 24 may deliver control information 26 to computing device 12 in response to receiving an alternating magnetic field generated by the NFC module of computing device 12. In other words, control information 26 may be data stored on identification device 24. Upon receiving the alternating magnetic field (e.g., receiving power sufficient to transmit data) computing device 12 may receive control information 26. In this manner, identification device 24 may only be capable of delivering or sending control information 26 when computing device 12 is within close physical proximity to each respective identification device 24. Although the user may physically touch, bump, or tap computing device 12 to identification device 24, computing device 12 may be capable of receiving control information 26 from identification device 24 without physically touching identification device 24.

Control information 26 may include any information related to controlling the operation of target device 22. For example, control information 26 may include information identifying target device 22 and at least one parameter that at least partially controls the operation of target device 22. In some examples, control information 26 may identify two or more parameters for controlling at least a portion of target device 22. Although control information 26 may include information associated with a control panel associated with target device 22, computing device 12 and/or remote server 18 may identify aspects of an appropriate control panel based on the identification of a parameter and/or target device 22. For example, computing device 12 and/or remote database 20 may store user preferences related to the arrangement of parameters in the control panel.

In some examples, computing device 12 may receive adjustments to one or more parameter of a control panel via user interaction with the control panel displayed on user interface 14. For example, the control panel may receive input via user interface 14. In other examples, computing device 12 may receive adjustments to one or more parameter of the control panel via movement of computing device 12. For example, different physical movements of computing device 12 may control the adjustment of the values of respective parameters displayed in the control panel. In another example, control information 26 may merely include information identifying the parameter of target device 22 such that remote database 20 stores an association between the parameter and the appropriate target device 22. Control information 26 may, in other examples, provide additional information related to the location of identification device 24, the location of target device 22, maximum and minimum values for the identified parameter, or any other information related to adjusting a parameter of target device 22 with computing device 12 or the displayed control panel.

Control information 26 may, in some examples, be in the form of a uniform resource locator (URL) that includes a domain associated with identification device 24 and/or target device 22 and an identifier for the control panel and/or specific parameters that will be adjusted by computing device 12, for example. An example URL may include the domain of remote server 18, a destination of the service that controls target device 22, an identifier of the specific target control device 22. This example URL may take the form of: "http:// www.domain.com/homecontrol/targetdevice12345." The "domain" may be the domain of remote server 18, "homecontrol" may be the name of the web-based service (e.g., a cloud-based control service) that controls target device 22, and "targetdevice12345" may be the identifier of the specific target device 22 that will be controlled. In some examples, additional identifiers may be used to identify specific parameters of target device 22 and/or selected characteristics of the control panel associated with control information 26. Computing device 12 may transmit adjustment information associated with adjustment input received by the control panel and/or movement in the form of data generated by moving computing device 12 in space. In other examples, the adjustment information may be in the form of accelerometer output values, or changes to sensor output, added to the end of the URL of control information 26. In some examples, this data may be transmitted as data directly to remote server 18 or directly to target device 22 via receiver 28. A URL or uniform resource name (URN) may be examples of a uniform resource identifier (URI). In this manner, control information 26 may be in the form of a URI in other examples. A URI may be a string of characters and/or numerals used to identify a name or a resource over a network.

In other examples, control information 26 may merely include a unique identifier that is unique to identification device 24. Computing device 12 or remote database 20 may store an association between the unique identifier and any information that allows computing device 12 to control target device 22 (e.g., information that identifies target device 22 and the control panel). In this manner, control information 26 may not include information directly identifying target device 22 and the parameter.

Control information 26 may be stored in a memory or other circuit of identification device 24 (or printed in the form of a visual indication) by the user of computing device 12, the user of target device 22, or by a manufacturer or professional with knowledge of target device 22. For example, the user may purchase identification device 24, or multiple identification devices 24, with control information 26 pre-stored on identification device 24. Identification device 24 with pre-stored control information 26 may be purchased with target device 22. Identification device 24 may thus be packaged with target device 22 and configured with control information 26 from the manufacturer. Alternatively, a distributor, salesperson, or technician may write control information 26 to identification device 24 (e.g., via NFC) or otherwise configured or print identification device 24 such that computing device 12 may obtain control information 26 from identification device 24. In other examples, computing device 12 or a different computing device may be used by a user to store control information 26 onto identification device 24. Control information 26 may be downloaded from remote server 18 or another networked device via network 16. Alternatively, computing device 12 may generate control information 26 based on input from the user or information received from target device 22. For example, control information 26 may include user preferences associated with the control panel to be displayed in response to obtaining control information 26.

In one example, computing device 12 may transmit control information 26 to remote server 18 via receiver 28 and network 16 upon obtaining or otherwise receiving control information 26 from identification device 24. In this manner, computing device 12 may not interpret or otherwise utilize control information 26 directly. Instead, remote server 18 may interpret control information 26 and use adjustment information transmitted from computing device 12 to return information related to the control panel and adjust the parameter of target device 22. Remote server 18 may also transmit the adjusted parameter or any other information related to control information 26, the parameter, or target device 22 to computing device 12.

However, in some examples, computing device 12 may be configured to interpret control information 26 such that computing device 12 may present the appropriate control panel or any other information associated with control information 26 to the user via user interface 14. In this example, computing device 12 may not require remote server 18 to present one or more pieces of information from control information 26. For example, user interface 14 of computing device 12 may present the control panel with an identification of target device 22, one or more parameters, and/or the web-based service associated with remote server 18. In addition, control information 26 may include one or more commands interpretable by one or more processors of computing device 12. For example, one command may instruct a processor to transmit control information 26 to remote server 18. Another command may instruct a processor to open and/or execute an application (e.g., an application that includes a control panel) associated with control of the parameter of control information 26. The application may manage communication between computing device 12 and remote server 18 and/or target device 22, manage adjustment information, and/or control the presentation of one or more control panels associated with control information received from one or more identification devices 24.

In one example, once computing device 12 obtains control information 26 from identification device 24, computing device 12 may transmit control information 26 to remote server 18 using receiver 28 and network 16. Network 16 may be any wired or wireless network that allows computing device 12 to access another computing device and/or the Internet. For example, computing device 12 may connect to network 16 to transmit control information 26 to remote server 18. Remote server 18 may then access remote database 20 to identify the particular target device 22 (e.g., an Internet Protocol address or other communication information) and the particular parameter identified by control information 26. Remote server 18 may then transmit, via network 16, parameter information (e.g., information related to the control panel) to computing device 12 (e.g., the type of parameter, a name of target device 22, and the current value of the parameter) and/or initiate communication with target device 22 in anticipation of adjusting the identified parameter.

When computing device 12 receives the parameter information from remote server 18, computing device 12 may display or otherwise present one or more parameters to the user in the control panel. In one example, computing device 12 may use user interface 14 to present control panels such as control panels 72 and 86 of FIG. 3. However, computing device 12 may additionally, or alternatively, use other output devices to present visual, audio, or even tactile feedback to the user according to the parameter information. In addition, computing device 12 may receive adjustments to the parameter value in response to remote server 18 adjusting the parameter value based on a function of the movement information transmitted by computing device 12. In this manner, the parameter value may be based on a function or relationship (e.g., a linear, logarithmic, discrete, polynomial, or other equation) between the parameter value and the movement information.

Alternative to transmitting adjustment information to remote server 18, computing device 12 may transmit the adjustment information directly to target device 22 via receiver 28. Receiver 28 may be a device hardwired or wirelessly coupled to target device 22. For example, receiver 28 may be an infrared or radio frequency receiver that receives a signal from computing device 12. In this manner, computing device 12 may directly communicate with target device 22 for adjusting the value of a desired parameter of the displayed control panel.

In addition to transmitting control information 26 to remote server 18, computing device 12 may also transmit movement information to remote server 18 when the adjustment to a parameter occurs with computing device movement. Alternatively, the detected movement may be used internally by computing device 12 to directly adjust the value of the parameter without remote server 18. Movement information may include any detection, sensed data, or measurements representative of the physical movement of computing device 12. In order to adjust the parameter identified by identification device 24, the user of computing device 12 may physically move computing device 12. The user may move computing device 12 whenever the user desires to change or adjust the parameter of control information 26. The control panel may indicate when a parameter is configured to be adjusted based on movement of computing device 12. The physical movement of computing device 12 may be a tilt or rotation of computing device 12, a linear movement of computing device 12. Although the exact movement of computing device 12 may not be purely linear or purely rotational, computing device 12 may still detect the movement for the identified parameter.

Computing device 12 may sense or detect this physical movement using one or more sensors within computing device 12. These one or more sensors may include an accelerometer, gyroscope, compass, and camera. For example, a gyroscope may sense rotation of computing device 12 about an axis orthogonal to the plane of user interface 14 (e.g., an axis into user interface 14. In another example, an accelerometer may sense lateral or vertical motion of computing device 12. A visual indication on identification device 24 or information in the displayed control panel may notify the user of computing device 12 which movement can be used to control the parameter of target device 22. In other examples, computing device 12 may indicate how the user can move computing device 12 to adjust the parameter and operation of target device 22.

The magnitude of the sensed, or detected, movement of computing device 12 may determine the magnitude of the adjustment of the parameter of target device 22. The sensed movement may be the difference between two measured values from the output of the one or more sensors. In some examples, computing device 12 may determine the difference between the measured values to calculate the magnitude of the movement in a useable unit (e.g., degrees of rotation or centimeters of movement). This magnitude may then be sent as movement information to remote server 18. In other examples, computing device 12 may transmit two or more measured values from a sensor as the movement information. In other words, remote server 18 may perform any calculations and/or calibration of the measured values.

Once remote server 18 receives the movement information from computing device 12, remote server 18 may calculate the appropriate adjustment to the value of the parameter identified by control information 26. Remote server 18 may then transmit the adjusted value to target device 22 to affect the operation of target device 22. In addition, remote server 18 may transmit the adjusted value of the parameter to computing device 12 for presentation to the user via user interface 14. In alternative examples, computing device 12 may directly determine the adjusted value of the parameter based on instructions received from remote server 18 for determined the value of the parameter. Computing device 12 may thus determine the adjusted value of the parameter, present the adjusted value to the user via user interface 14, and transmit the adjusted value to remote server 18 such that remote server 18 may control target device 22 to adjust the value of the parameter. In some examples, computing device 12 may directly transmit the adjusted parameter value to target device 22.

In this manner, the user may adjust the parameter of target device 12 without providing input to computing device 12 via user interface 14. Instead, the user may hold computing device 12 in a hand and move computing device 12 in space to adjust the value of the parameter. This movement technique may facilitate control of target device 22 when using buttons, touch screens, or other input mechanisms may not be desired by the user. However, these other input mechanisms may also be used with the control panel. In addition, the movement technique may reduce the amount of time needed to adjust a parameter by reducing or eliminating the navigation of menus or other interfaces to control one or more different target devices. In other words, the user may adjust the intended parameter of target device 22 by placing computing device 12 in close proximity to identification device 24 and then moving computing device 12 in the appropriate fashion to adjust the parameter. The displayed control panel may provide feedback regarding the magnitude to which the value of the parameter was adjusted.

One or more identification devices 24 may be disposed at various locations around a room, a house, an office, a building, or any other space associated with target device 22. Multiple identification devices 24 may even be provided for the same parameter of the same target device 22 or different parameters of the same target device 22. In this manner, the user may control one or more parameters at different locations (e.g., at any location of an identification device). In some examples, control information 26 from one identification device 24 may identify two or more parameters of a control panel. Different input mechanisms and/or different movements of computing device 12 may be used to adjust respective parameters. For example, computing device 12 may detect rotation of computing device 12 for adjusting a volume parameter and linear movement of computing device for changing between songs being played by target device 22. Identification device 24 may visual indicate which parameters are adjustable and what movements are required to adjust the respective parameters. Alternatively, user interface 14 may present the instructions for adjusting the parameters to the user via the displayed control panel. In most examples, control information 26 and the movement information transmitted to remote server 18 may allow target device 22 to be managed or otherwise controlled by a central server (e.g., remote server 18), a central database (e.g., remote database 20), or any web-based resource or service.

User interface 14 may include an input device and an output device so that the user can communicate with computing device 12. In one example user interface 14 may be a touch screen interface. In other examples, user interface 14 may include a display and one or more buttons, pads, joysticks, mice, or any other device capable of turning user actions into electrical signals that control computing device 12. In addition, computing device 12 may include one or more microphones, speakers, cameras, or tactile feedback devices to deliver information to the user or receive information. In any example, the user may interact with user interface 14 during the adjustment of the parameter when needed. For example, user interface 14 may present a parameter and/or adjustment input mechanism to the user within a displayed control panel.

In some examples, the control of target device 22 may be managed by a service. This service may be internet based and accessed by the user using an application, web browser, or any other user interface that enables the user to interact with the service. In some cases the service may be accessed through a standalone application that is launched in response to obtaining control information 26 and operates with the operating system of computing device 12. Alternatively, the application may be a sub-routine built into an operating system running on computing device 12. In any case, computing device 12 may access the service to transmit control information 26 and movement information to the service (e.g., remote server 18). The service may directly control target device 22 by transmitting parameter adjustments to target device 22 according to inputs received by computing device 12 (e.g., detected movement or input via a displayed control panel). Although a standalone application may be used to access the services, the operating system may include the required functionality to directly interface with the control service (e.g., directly calling application programming interfaces (APIs) of the service with the operating system of computing device 12).

Computing device 12 may also include techniques to handle errors when obtaining control information 26, transmitting the obtained control information 26, and or receiving the parameter information from remote server 18. For example, computing device 12 may not recognize or be able to interpret control information 26 received from identification device 24. In this event, computing device 12 may prompt the user via user interface 14 to address this error in control information 26. For example, user interface 14 may prompt the user to reposition computing device 12 near identification device 24 or enable short-range communication of computing device 12 if the feature is not enabled.

Remote server 18 and remote database 20 may each include one or more servers or databases, respectively. In this manner, remote server 18 and remote database 20 may be embodied as any hardware necessary to receive control information 26, store the associations between control information 26 and target device 22, or transmit information to computing device 12 over network 16. Remote server 18 may include one or more desktop computers, mainframes, minicomputers, or other computing devices capable of executing computer instructions on one or more processors and storing data. Remote database 20 may include one or more memories, repositories, hard disks, or any other data storage device. In some examples, remote database 20 may be included within remote server 18.

Remote server 18 may connect to network 16. Network 16 may be embodied as one or more of the Internet, a wireless network, a wired network, a cellular network, or a fiber optic network. In other words, network 16 may be any data communication protocol that facilitates data between two or more devices.

In some examples, remote database 20 may include Relational Database Management System (RDBMS) software. In one example, remote database 20 may be a relational database and accessed using a Structured Query Language (SQL) interface that is well known in the art. Remote database 20 may alternatively be stored on a separate networked computing device and accessed by remote server 18 through a network interface or system bus. Remote database 20 may in other examples be an Object Database Management System (ODBMS), Online Analytical Processing (OLAP) database or other suitable data management system.

Generally, this disclosure is directed to displaying virtual control panels on a computing device in response to obtaining control information from an identification device remote from a target device that will be controlled. In one example, computing device 12 may obtain control information 26 from identification device 26 located remote from target device 22, wherein control information 26 is associated with the target device. Responsive to obtaining control information 26, computing device 12 may display a control panel at a display of computing device 12, wherein the control panel may include at least one parameter that at least partially defines operation of target device 22. Computing device 12 may also receive an adjustment to the at least one parameter of the control panel. This adjustment may be in the form of an input via the control panel and/or detected movement of computing device 12. Responsive to receiving the adjustment, computing device 12 may transmit adjustment information to 28 receiver associated with target device 22. The adjustment information may be representative of the adjustment. In other examples, a computer-readable medium may instruct one or more processors to perform one or more of these acts.

In some examples, computing device 12 may obtain control information 26 from different identification devices 24. For example, in addition to obtaining control information from a first identification device, computing device 12 may then obtain additional control information 26 from a second identification device (e.g., similar to identification device 24) located remote from a second target device (e.g., a device similar to target device 22). Each identification device may provide control information associated with a respective target device. In some examples, two different identification devices may provide control information associated with a respective function of a single target device. For example, one identification device may provide control information associated with a volume control of the target device and another identification device may provide control information associated with a channel control for the same target device. In this manner, computing device 12 may obtain control information to control multiple functions from a single target device. In response to obtaining additional information, computing device 12 may perform one or more operations with regard to control panels displayed at computing device 12.

In one example, the control panel may include at least one parameter that at least partially defines operation of the first target device and at least one parameter that at least partially defines operation of the second target device. A single control panel may thus include parameters for different target devices. Alternatively, the single control panel may include different parameters, each obtained from different identification devices, associated with the same target device. In other examples, computing device 12 may separate the control panel into sub-panels, each associated with a separate target device. In this manner, computing device 12 may display a first control sub-panel that includes at least one parameter that at least partially defines operation of the first target device and a second control sub-panel that includes at least one parameter that at least partially defines operation of the second target device. In this manner, computing device 12 may "stack" or otherwise display multiple control panels at the same time.

In some examples, computing device 12 may display the first control sub-panel adjacent to the second control at the display. The sub-panels may be displayed horizontally adjacent, vertically adjacent, or in some other configuration. If the sub-panels do not fit entirely within the display of user interface 14, the user may scroll to view other portions of the non-displayed subpanel. In other examples, the user may define how the sub-panels are displayed. Computing device 12 may receive a touch input from the display, wherein the touch input defines a spatial relationship between the first control sub-panel and the second control sub-panel at the display. In other words, the user may select locations for a specific sub-panel or drag a desired sub-panel to a desired location.

The parameters of multiple target devices may be managed in different manners. In one example, computing device 12 may compare a plurality of parameters associated with the first target device and a plurality of parameters associated with the second target device. Computing device 12 may then identify at least one parameter common to both the first target device and the second target device. Computing device 12 may select one of the first target device or the second target device to be controlled with the common parameter and display the common parameter on the control panel. Computing device 12 may select which target device to be controlled with the common parameter based on stored user preferences, the most recent control information 26 received by computing device 12, a configuration of one of the target devices, or any other factors.

In addition, computing device 12 may consolidate inputs for a common parameter. For example, computing device 12 may identify a parameter common to both the first target device and the second target device, map a single input mechanism to the common parameter for each of the first target device and the second target device, and display the single input mechanism on the control panel. This single input mechanism may thus be used to receive an adjustment to both parameters of the target devices with a single action from the user.

In other examples, computing device 12 may not combine or stack multiple control panels. Instead, computing device 12 may replace the first control panel with a second control panel associated with the second target device in response to obtaining control information from the second target device. Since the user may be finished controlling the first target device when the control information for the second target device is obtained, replacing the first control panel may simplify the control panel arrangement for the user. Alternatively, computing device 12 may display the second or new control panel on a different screen of user interface 14 to allow the user to navigate between control panels associated with obtained control information 26.

In other examples, a control panel may include too may inputs, parameters, or other features such that the control panel is displayable within the resolution of the display of user interface 14. Computing device 12 may allow the user to scroll between different portions of these oversized control panels. In one example, computing device may display a first portion of the control panel, with the remainder of the display not viewable to the user. Computing device 12 may then detect movement of computing device 12 in a first direction, and, responsive to the movement, scroll the control panel in a second direction opposite the first direction to display a second portion of the control panel. In this manner, moving computing device 12 to display another portion of the control panel may be similar to placing user interface 14 over the desired portion of a virtual control panel. In some examples, computing device 12 may display a scroll icon that indicates a portion of the control panel is not currently displayed at the display. Alternative to using computing device 12 movement, computing device 12 may receive touch input that moves the control panel or other scrolling input.

The user may provide varying inputs to computing device 12 to adjust a value of a parameter provided by a control panel. In one example, computing device may receive an adjustment input via the control panel at the display. The adjustment input may be depressing a button, portion of a touch screen, or other input for the parameter. Alternatively, computing device 12 may receive the adjustment to the parameter by using a sensor to detect movement of computing device 12. The sensor may be an accelerometer, gyroscope, compass, or any other movement detecting sensor. Computing device 12 may then determine the adjustment to the at least one parameter as a function of the detected movement. For example, computing device 12 may scale the output of the sensor to the appropriate value of the parameter.

The displayed control panel may be a default control panel with preset parameters, orientations, and dimensions. In other examples, the control panel may be configured with stored user preferences. The user preferences may be stored in a memory of computing device 12, identification device 24, and/or remote server 18. Computing device 12 may thus configure the at least one parameter based on a set of user preferences and display the control panel according to the configuration. For example, the control panel may be configured for right or left handedness. Certain adjustment inputs for parameters may be positioned on the left or right side of user interface 14, and the user's handedness may be used to configure the control panel.

In some examples, computing device 12 may display the control panel even while computing device 12 is in a passcode locked state. In this manner, the user may not need to enter an authenticated passcode to adjust a parameter of target device 12. Alternatively, one or more security measures may be implemented to restrict control of target device 22. For example, computing device 12 may, responsive to obtaining the control information 26, present a passcode input screen at the display (e.g., user interface 14) of computing device 12. Computing device 12 may then receive a passcode input from a user via the passcode input screen and, responsive to receiving the passcode input, display the control panel at the display. Control information 26, information stored in a memory of computing device 12, and/or information stored in remote database 20 may require the passcode prior to displaying the control panel. In addition, control information 26 may be encrypted in some examples. Computing device 12 may thus be configured to decrypt control information 26 prior to displaying the control panel and/or adjusting a parameter.

As described herein, remote server 18 may be utilized to control target device 22. In this manner, receiver 28 may be part of a network access point that communicates the adjustment to a networked device (e.g., remote server 18) via network 16. Remote server 18 may then control target device 22 according to the adjustment received by computing device 12. In some examples, control information 26 may include a URI (e.g., a uniform resource locator (URL)) configured to direct a browser of computing device 12 to a web-based service associated with remote server 18. The URL may include a code that identifies the parameter and/or target device 22. In other examples, computing device 12 may launch a control application that executes on computing device 12 in response to obtaining control information 26. The control application may at least partially manage the control panel and/or the adjustment of one or more parameters.

Control information 26 may be obtained using near-field communication (NFC). In this manner, identification device 24 may include circuitry required to operate identification device 24 as a passive or active NFC device. Computing device 12 may be configured to write control information 26 to identification device 24 in some examples. In other examples, computing device 12 may obtain control information from an optical code. The optical code may be a bar code, quick resource code, or any other unique visual pattern that may be interpreted by computing device 12 to control target device 22. These optical codes may also be produced by the user using a printer in some examples. In some examples, identification device 24 may be a sticker, tag, coaster, relatively flat device, or any other package capable of performing the functions described herein. Identification device 14 may be configured to blend into the surface on which it is disposed or be otherwise visual innocuous. For example, identification device 24 may be painted the same color as the wall it is disposed.

Target device 22 may be at least one of a media system, a lighting system, a sound system, a heating system, or a security system. In addition, target device 22 may include receiver 28 in some examples. Therefore, a control parameter displayed in a control panel may include at least one of a volume control, a channel control, a light intensity control, a temperature control, a security system control, a motor control, a fan control, a timer (e.g., an on-timer or an off-timer), or a toggle control (e.g., a garage door opener), or any other parameter. Any other parameter of a controllable device may also be configured to be controlled using a control panel displayed by computing device 12 in response to obtaining control information 26.

The movement information used by remote server 18 (or computing device 12 in some examples) to adjust the value of a parameter or scroll to different portions of a control panel may be generated by computing device 12. One or more sensors housed by computing device 12 or otherwise coupled to computing device 12 may sense or detect physical movement of computing device 12 caused by the user. In this manner, the detected movement may be related to a magnitude change in the parameter of target device 12. In other words, larger movements of computing device 12 may correspond to a greater change in the value of the parameter. As described herein, the detected movement may be a change between two measured values from one or more sensors. Computing device 12 may generate the movement information (e.g., adjustment information) with merely the measured values from the sensor or with a calculated absolute movement value. Remote server 18 may then translate the movement information into an adjustment to the parameter value of control information 26. Remote sever 18 may then transmit the adjusted parameter value to target device 22 to control the operation of target device 22 and, in some examples, transmit the adjusted parameter value to computing device 12 for presentation to the user as feedback for the physical movement.

Many different movements of computing device 12 may be detected and used to adjust the parameter value for controlling target device 22. For example, computing device 12 may detect rotation (or tilt), linear movement (e.g., translation), or any other combination of movements. In one example, computing device 12 may detect a tilt angle between a first measurement and a second measurement of the sensor. The tilt angle may be representative of a rotation about an axis orthogonal to the computing device. In other examples, the tilt angle may be a measure of the rotation of computing device 12 about an axis orthogonal to user interface 14. This tilt angle may simulate adjustment of an analog dial or similar input mechanism for controlling a device.

The first measurement for detecting the tilt angle may be taken upon obtaining control information 26 or otherwise receiving an input from the user via a control panel indicating the adjustment is to begin. The second measurement may then be the latest, or most current, measurement from the sensor. The difference between the first and second measurements may thus be used to determine the tilt angle for adjusting the value of the parameter. In another example, the first and second measurements may represent the sensor output at consecutive sampling periods. In other words, computing device 12 may sample the output from the sensor at a predetermined frequency. The second measurement may be the most recent measurement and the first measurement may be the previous measurement. As the sensor output is sampled, the differences between consecutive first and second measurements may be summed during the adjustment period to provide an up-to-date adjustment to the parameter value. In this manner, computing device 12 may transmit subsequent measurements as each measurement is detected or at a separate transmission frequency. In one example, computing device 12 may transmit updated movement information whenever the difference between the first and second measurements is non-zero (e.g., the user has requested a change to the parameter value by moving computing device 12).

The sample rate of the output of the one or more sensors for detecting movement may generally be between approximately 1.0 Hz and approximately 1000 Hz. However, the sample rate may be lower or higher than that range in some examples. In other examples, the sample rate may be between approximately 5.0 Hz and 10 Hz. The sample rate may be selected based on hardware limitations and/or power use considerations. For example, the sample rate may be set to detect movement of computing device 12 without consuming more power than necessary. In other examples, the sample rate may be set based on the type of movement (e.g., rotation vs. linear movement) and/or user preferences.

Computing device 12 may detect the tilt angle (e.g., the rotation) from the user using a variety of sensors and methods. For example, computing device 12 may utilize one or more accelerometers that measure an orientation of computing device 23 with respect to gravity. The one or more accelerometers may be a one, two, or three axis accelerometer. Alternatively, computing device 12 may include two or more different accelerometers for measuring the relative rotation of computing device 12. The tilt angle may be determined by measuring the angle between two vectors in time. The angle may be the absolute angle between the vectors. However, the tilt angle may alternatively be the angle using only two axes in the plane of user interface 14. In other examples, an angle between two vectors in three-dimensions may be only determined within a specific place (e.g., the plane of user interface 14 or computing device 12). In this manner, computing device 12 may determine the tilt angle without distortion from undesired tilt outside of the plane desired for adjusting the parameter. In some examples, computing device 12 may use an accelerometer to detect the tilt angle whenever computing device 12 oriented vertical with respect to the ground.

In another example, computing device 12 may detect the tilt angle by measuring an orientation of computing device 12 with respect to earth's magnetic field. Computing device 12 may include a sensor in the form of a compass configured to detect the surrounding magnetic field. For the compass to function as sensor to detect the tilt angle, the user may orient computing device 12 in a position approximately parallel to the ground (i.e., the earth). Rotation of computing device 12 may then occur generally in the plane parallel to the ground. In some examples, computing device 12 may use the compass to detect the tilt angle whenever computing device 12 oriented parallel to the ground.

In other examples, computing device 12 may detect the tilt angle by measuring an angular acceleration of computing device 12. Computing device 12 may include one or more gyroscopes or other sensors configured to detect the angular acceleration of computing device 12. The detected angular acceleration of computing device 12 may be used to identify the direction and magnitude of the rotation of computing device 12. For example, double integrating the angular acceleration may result in the angular distance, e.g., the tilt angle, computing device 12 moved between subsequent measurements. Single integration of the angular acceleration may yield an angular velocity that may be used to vary the rate at which the parameter is adjusted. In other words, higher angular velocities may indicate that the user desires to make a larger magnitude change in the parameter value. Remote sever 18 may thus increase the parameter value change per unit of angular distance. Conversely, lower angular velocities may indicate that the user desires to make more fine adjustments to the parameter. Remote sever 18 may thus decrease the parameter value change per unit of angular distance. In this manner, computing device 12 and/or remote server 18 may provide an adaptive adjustment rate reflective of the detected rotational rate of computing device 12. This adaptive adjustment rate may be applicable to any technique for detecting movement of computing device 12 (e.g., rotational or linear movement).

In other examples, computing device 12 may detect linear movement of computing device 12 to adjust the value of the parameter. For example, computing device 23 may include an accelerometer or other sensor that measures one or more accelerations of computing device 12. Computing device 12 and/or remote server 18 may then calculate a distance and direction computing device 12 was moved between a first measurement and a second measurement. For example, computing device 12 may take the double integral of the acceleration measured over a selected time period to calculate the distance computing device 12 was moved through space. In some examples, computing device 12 may correct the calculated distance to account for movement out of the plane of user interface 14 if computing device 12 is to move only left, right, up, or down.

In this manner, the detected movement may be movement detected from an accelerometer or other linear movement sensors. The accelerometer may include one or more three-axis accelerometers. In one example, computing device 12 may measure accelerations of computing device 12 after obtaining control information 26 and calculate the distance and direction computing device 12 was moved between subsequent measurements after obtaining control information 26. The distance computing device 12 has been moved may be calculated by double integration of the accelerometer measurements. In addition, the direction may be determined integrating the acceleration measurements from the previous identification device 24 and determining a speed vector in two or three dimensions.

In some alternative examples, computing device 12 may detect movement of computing device 12 by capturing a plurality of images with a sensor of the computing device. The sensor may be an image sensor disposed on a surface of computing device 12 that faces identification device 24 and the surface on which identification device 24 is located (e.g., a rear facing camera). From the captured images, computing device 12 may calculate a distance and a direction that computing device 12 was moved from the detected identification device 24 based on a rate and direction one or more pixels have moved between the captured images. Computing device 12 may, in one example, analyze the captured images, identify common features between the images (e.g., common groups of pixels), count the number of pixel changes between each image, and estimate the movement of computing device 12 based on the number of counted pixels. Computing device 12 may also employ other algorithms selected to convert feature movement between images to distance moved. These algorithms may incorporate additional data, such as focal length, to calibrate the distance per pixel calculation. In other words, larger focal lengths in the images may indicate a larger coverage length of the image for each pixel.

In addition computing device 12 may calculate a direction that computing device 12 has moved based on how many pixels the structures in the images moved in two dimensions. This vector may indicate an angle with respect to identification device 24. Over multiple images, computing device 12 may add the vectors of each change in the images to determine a resulting movement of computing device 12. This resulting movement, both direction and distance, may be transmitted by computing device 12 to remote sever 18 via network 16 such that remote server 18 can determine the movement of computing device 12 and the adjustment to the value of the identified parameter of control information 26.

Since the target device 22 may be controlled by remote server 18 based on the physical movement of computing device 12, computing device 12 may not be able to interpret control information 26 to identify what adjustment will be made to the parameter of target device 22. Therefore, computing device 12 may receive the adjusted value of the parameter from remote server 18 after the adjustment is made. In other words, remote server 18 may transmit the adjusted value to computing device 12 via network 16 after the adjustment has been made or upon determining the adjusted value of the control parameter. Computing device 12 may also present the adjusted value of the control parameter using user interface 14. Therefore, the user of computing device 12 may receive feedback as to how the control parameter has changed based on the movement of computing device 12.

In some examples, any physical movement of computing device 12 detected after obtaining control information 26 may be used to adjust the value of the identified parameter. Computing device 12 may stop transmitting movement information to remote server 18 (e.g., terminate the adjustment of the parameter) upon losing communication with identification device 24 (e.g., no longer able to obtain control information 26 from identification device 24). In other examples, computing device 12 may stop transmitting movement information to remote server 18 in response to receiving a cancel input from the user via user interface 14 that closes the control panel. In this manner, the user may take computing device 12 anywhere to adjust the parameter value after obtaining control information 26. In other examples, computing device 12 may cancel adjustment after a predetermined elapsed time and/or an elapsed time from the last detected movement of computing device 12.

Alternatively, the movement information transmitted by computing device 12 to remote server 18 for adjusting the value of the parameter may only include detected movement selected by the user. For example, computing device 12 may receive a clutch input during the detection of movements. The clutch input may include depressing a button or touching a defined region of user interface 14. For example, the button for the clutch may be a side switch on the side of computing device 12 for manipulation when computing device 12 is gripped by a hand of the user. In another example, the button may be a pressure sensor disposed along a side of the housing of computing device 12. The pressure sensor may detect when the user squeezes computing device 12 beyond a threshold that is representative of the clutch input. Initiation of the clutch input may define the first measurement and termination of the clutch input may define the second measurement of the sensor. In other words, only movements detected when the clutch input is selected may be used to adjust the parameter value. The clutch input may allow the user more control over how to adjust the parameter value.

The clutch input may allow the user to move computing device 12 back and forth while adding only those movements in a certain direction. In other words, computing device 12 may be subject to multiple passes through a movement range to further increase, or further decrease, the value of the parameter. For example, the user may provide the clutch input during a clockwise rotation of computing device 12, terminate the clutch input and rotate computing device 12 counterclockwise, then provide the clutch input a second time during a subsequent clockwise rotation. In this example, the parameter value would only be adjusted during the clockwise rotations (e.g., adding the second clockwise rotation to the value without subtracting the intermediary counter-clockwise rotation). The clutch input may need to be continually provided to adjust the parameter value with the movement during the clutch input. Alternatively, the clutch input may be provided once to start the adjustment and provided a second time to terminate the adjustment.

In other examples, computing device 12 may deliver an audio feedback to a user based on a magnitude of the detected physical movement. For example, computing device 12 may provide one or more "beeps" or other sounds to the user in response to detecting the movement and/or the adjusted value of the parameter from remote server 18. In addition, computing device 12 may provide tactile feedback (e.g., vibrations) to the user to indicate detected movements, magnitude of the movement, and/or adjustments to the parameter.

Various aspects of the disclosure may be operable only when the user has explicitly enabled such functionality. In addition, various aspects of the disclosure may be disabled by the user. Thus, a user may elect to prevent computing device 12 from transmitting control information 26 and/or movement information to remote server 18 or receive parameter information directly from remote server 18. More generally, privacy controls may be applied to all aspects of the disclosure based on a user's privacy preferences to honor the user's privacy preferences for utilizing the functionality described in this disclosure.

Figure 2:
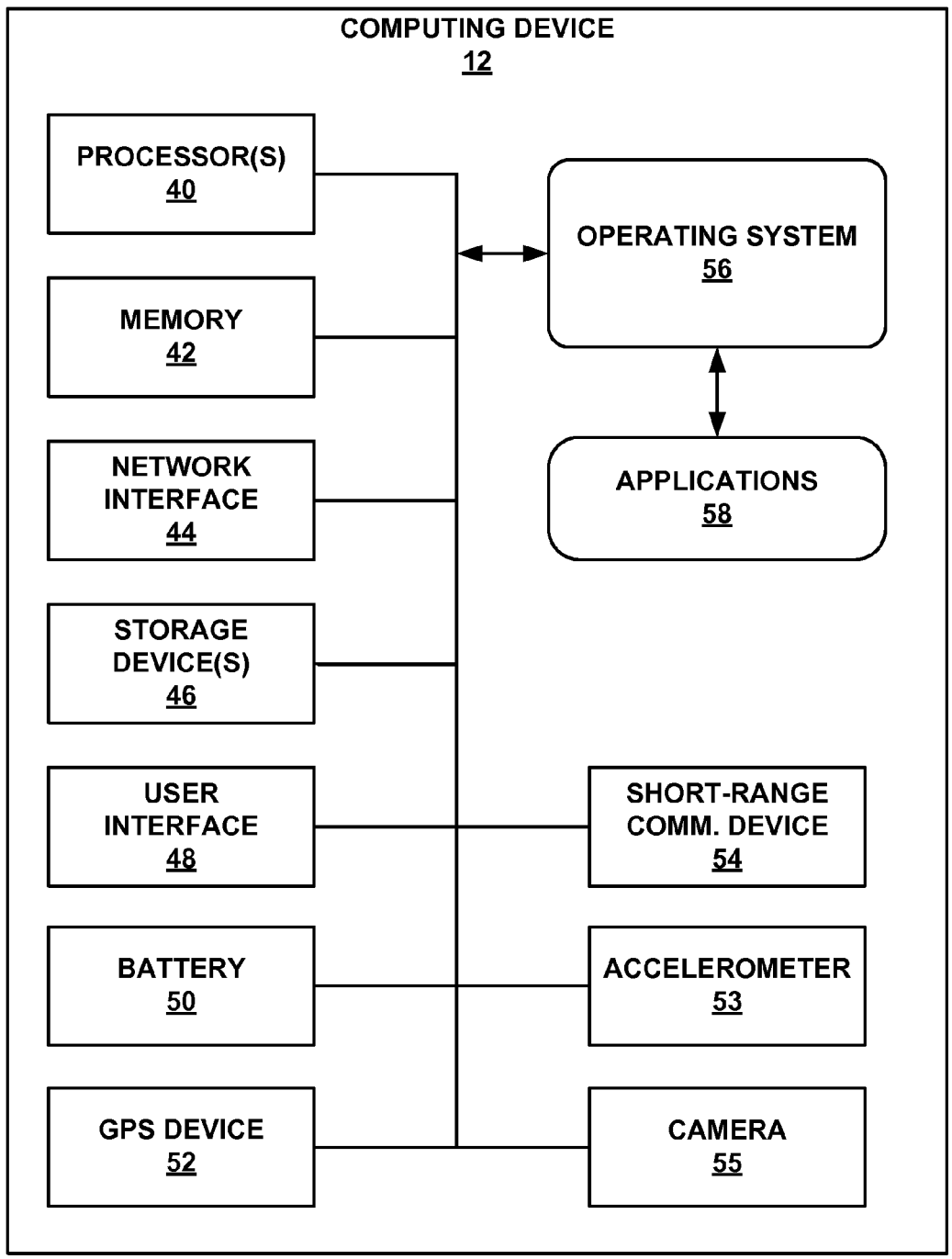
FIG. 2 is a block diagram illustrating components of one example of the computing device shown in FIG. 1, in accordance with one or more aspects of the present disclosure.

FIG. 2 is a block diagram illustrating components of one example of computing device 12 shown in FIG. 1. FIG. 2 illustrates only one particular example of computing device 12, and many other example embodiments of computing device 12 may be used in other instances. For example, computing device 12 may include additional components and run multiple different applications.

As shown in the specific example of FIG. 2, computing device 12 includes one or more processors 40, memory 42, a network interface 44, one or more storage devices 46, user interface 48, battery 50, GPS device 52, short-range communication device 54, accelerometer 53, and camera 55. Computing device 12 also includes an operating system 56, which may include modules and/or applications that are executable by processors 40 and computing device 12. Computing device 12, in one example, further includes one or more applications 58. One or more applications 58 are also executable by computing device 12. Each of components 40, 42, 44, 46, 48, 50, 52, 53, 54, 55, 56, and 58 may be interconnected (physically, communicatively, and/or operatively) for inter-component communications.

Processors 40, in one example, are configured to implement functionality and/or process instructions for execution within computing device 12. For example, processors 40 may be capable of processing instructions stored in memory 42 or instructions stored on storage devices 46. These instructions may define or otherwise control the operation of operating system 56 and applications 58.

Memory 42, in one example, is configured to store information within computing device 12 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 12 (e.g., one or more of applications 58) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 12, in some examples, also includes a network interface 44. Computing device 12, in one example, utilizes network interface 44 to communicate with external devices via one or more networks, such as network 16 in FIG. 1. Network interface 44 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 12 utilizes network interface 44 to wirelessly communicate with an external device (not shown) such as a server, mobile phone, or other networked computing device.

Computing device 12, in one example, also includes one or more user interfaces 48. User interface 48 may be an example of user interface 14 described in FIG. 1. User interface 48 may be configured to receive input from a user (e.g., tactile, audio, or video feedback). User interface 48 may include a touch-sensitive and/or a presence-sensitive screen, mouse, a keyboard, a voice responsive system, or any other type of device for detecting a command from a user. In some examples, user interface 48 includes a touch-sensitive screen, mouse, keyboard, microphone, or camera.

User interface 48 may also include, combined or separate from input devices, output devices. In this manner, user interface 48 may be configured to provide output to a user using tactile, audio, or video stimuli. In one example, user interface 48 may include a touch-sensitive screen, sound card, a video graphics adapter card, or any other type of device for converting a signal into an appropriate form understandable to humans or machines. In addition, user interface 48 may include a speaker, a cathode ray tube (CRT) monitor, a liquid crystal display (LCD), or any other type of device that can generate intelligible output to a user.

Computing device 12, in some examples, include one or more batteries 50, which may be rechargeable and provide power to computing device 12. Battery 50, in some examples, is made from nickel-cadmium, lithium-ion, or other suitable material. In other examples, battery 50 may be a power source capable of providing stored power or voltage from another power source.

Computing device 12 may also include one of more GPS devices 52. GPS device 52 may include one or more satellite radios capable of determining the geographical location of computing device 12. Computing device 12 may utilize GPS device 52 to confirm the validity of visual media 22, for example. Alternatively, computing device 12 may transmit the GPS coordinates to remote server 18 to identify the location and the specific visual media 22.

In addition, computing device 12 may include one or more short-range communication device 54. For example, short-range communication device 54 may be an NFC device. As described herein, short-range communication device 54 may be active hardware that is configured to obtain location information from identification device 24. In general, short-range communication device 54 may be configured to communicate wirelessly with other devices in physical proximity to short-range communication device 54 (e.g., approximately 0-10 meters). In other examples, short-range communication device 54 may be replaced with an alternative short-range communication device configured to obtain control information 26 from respective identification device 24. These alternative short-range communication devices may operate according to Bluetooth, Ultra-Wideband radio, or other similar protocols.

Computing device 12 may also include various sensors. Computing device 12 may include one or more accelerometers 53 that sense accelerations of computing device 12. Accelerometer 53 may be a three-axis accelerometer that senses accelerations in multiple dimensions. Alternatively, accelerometer 53 may include two or more single-axis or two-axis accelerometers. Computing device 12 may utilize accelerometer 53 to detect physical movement of computing device 12 for adjusting the parameter or scrolling within a control panel identified by control information 26. In other examples, computing device 12 may also include one or more gyroscopes to sense angular acceleration or compasses to sense the direction computing device 12 with respect to the earth's magnetic field.

Camera 55 may be an optical sensor that computing device 12 controls. Computing device 12 may capture images and/or video using camera 55. In some examples, camera 55 may be used to obtain control information 26 and/or detect movement of computing device 12 with respect to identification device 24 and/or another surface. Camera 55 may be located on any surface of computing device 12 in some examples. In other examples, computing device 12 may include two or more cameras.

Computing device 12 may include operating system 56. Operating system 56, in some examples, controls the operation of components of computing device 12. For example, operating system 56, in one example, facilitates the interaction of application 58 with processors 40, memory 42, network interface 44, storage device 46, user interface 48, battery 50, GPS device 52, short-range communication device 54, accelerometer 53, and camera 55.

Application 58 may be an application configured to manage obtaining control information 26, displaying control panels, transmitting control information 26 to remote server 18, receiving adjustment input via control panels, detecting movement of computing device 12, and receiving information from remote server 18. Application 58 may control one or more of these features. Application 58 may thus control any aspect of interaction with identification device 24 and remote server 18. Application 58 may be automatically launched upon obtaining control information 26 if application 58 is not already being executed by processors 40. Application 58 may also be used to measure and/or calculate the detected movement of computing device 12 or any other functionality described herein. Although one application 58 may manage obtaining control information 26 and adjusting the control parameter, separate applications may perform these functions in other examples. Although application 58 may be software independent from operating system 56, application 58 may be a sub-routine of operating system 56 in other examples.

Computing device 12 may utilize additional applications to manage any functionality described herein with respect to system 10 or other aspects of computing device 12. Any applications (e.g., application 58) implemented within or executed by computing device 12 may be implemented or contained within, operable by, executed by, and/or be operatively/communicatively coupled to components of computing device 12 (e.g., processors 40, memory 42, network interface 44, and/or storage devices 46).

Figure 3:
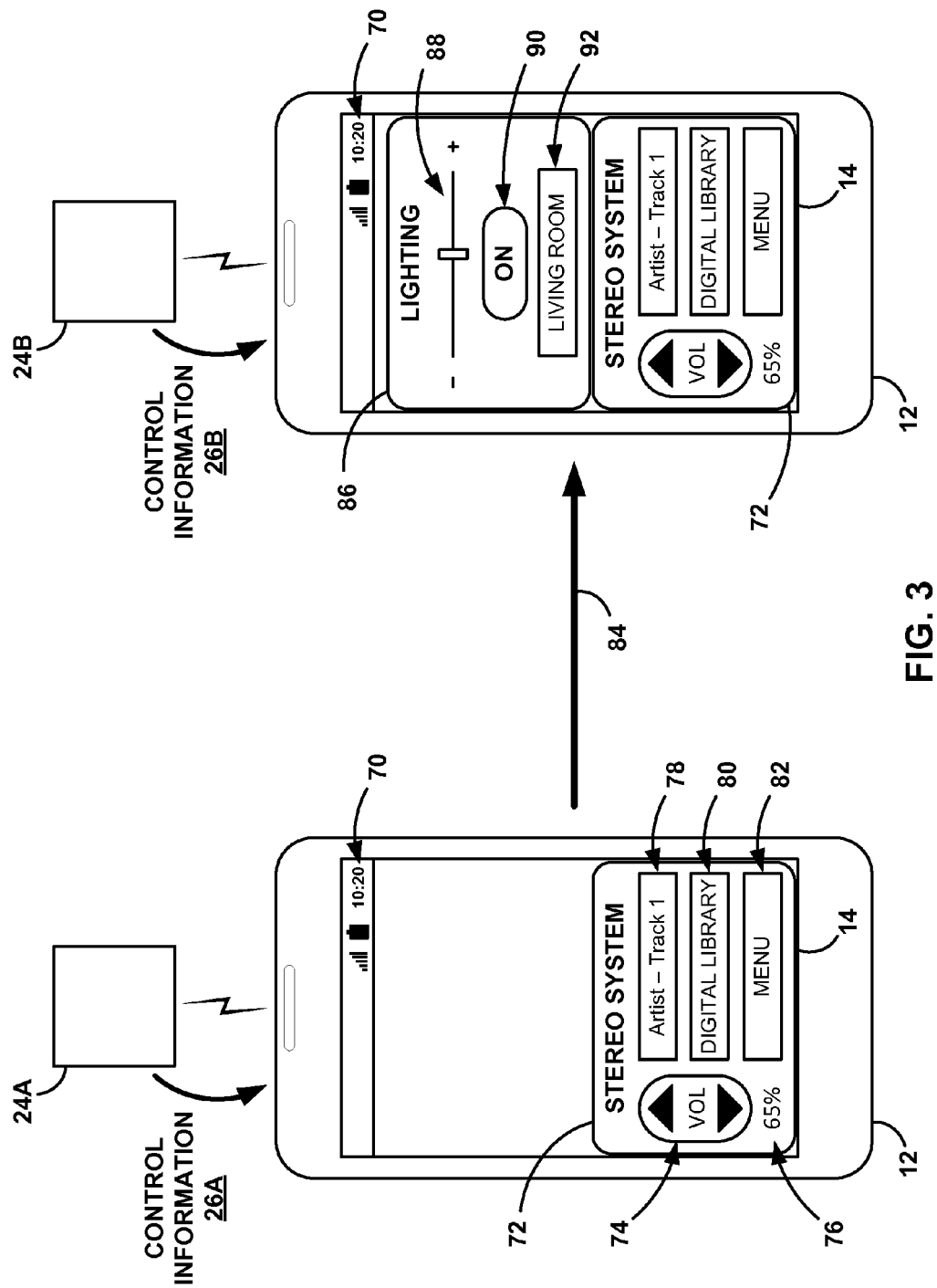
FIG. 3 is a conceptual diagram illustrating an example user interface containing stacked control panels from control information obtained from different identification devices.

FIG. 3 is a conceptual diagram illustrating an example user interface 14 containing stacked control panels from control information obtained from different identification devices 24A and 24B (collectively "identification devices 24"). As shown in the example of FIG. 3, computing device 12 may obtain control information 26 associated with different target devices from respective identification devices 24. When computing device 12 obtains control information for multiple control panels, computing device 12 may stack each control panel (e.g., as different control sub-panels). In other examples, computing device 12 may replace the first control panel with a second control panel.

Computing device 12 may first obtain control information 26A from identification device 24A. In response, computing device 12 may display control panel 72. Control panel 72 may include multiple parameters that define at least part of the operation of a stereo system target device. User interface 14 may include a status bar that includes various notifications and information related to the operation of computing device 12, such as network signal strength, battery power, and the current time. In addition, user interface 14 may display control panel 72.

Control panel 72 may include several parameters. For example, control panel 72 may include volume input 74, volume value 76, selection 78, source 80, and menu 82. Each of these items may be an adjustment input that, when selected by the user, may be used to adjust the respective parameter. Volume input 74 may be an adjustment input for adjusting the volume of the stereo system, and volume value 76 may indicate the current value of the volume parameter. Selection 78 may indicate the current artist and track being played, source 80 may indicate where the selection is being played from, and menu 82 may allow the user to control additional parameters of the stereo system not displayed in control panel 72. Each of selection 78, source 80, and menu 82 may also present drop down menus or other inputs when selected.

The user may move computing device in the direction of arrow 84 such that computing device 12 can obtain control information 26B from a different identification device 24B. In response to obtaining control information 26B, computing device 12 may display control panel 86. Since control panel 72 has not been closed, computing device 12 may stack control panel 86 adjacent to (e.g., on top of) control panel 72. The user may thus control parameters from both the target device of control panel 72 and control panel 86.

Control panel 86 may include parameters that at least partially control the operation of a lighting system. For example, control panel 86 may include light intensity slider 88 for adjusting the intensity of the lighting system or a portion of the lighting system. Power button 90 may be used to toggle between turning the lights "ON" and "OFF." In addition, zone selector 92 may be selected by the user to display a drop down menu from which other lighting zones may be selected. Zone selector 92 currently indicates that the lighting in the "Living Room" is being controlled by control panel 86.

Although only two control panels 72 and 86 are provided as examples, computing device 12 may stack three or more control panels in other examples. If computing device 12 can no longer display any more control panels, computing device 12 may automatically close or delete the control panel from the first obtained control information 26. Alternatively, computing device 12 may receive a cancel input from the user that closes a control panel.

In other examples, different identification devices 24 may provide control information that identifies respective parameters of the same target device. In this manner, responsive to receiving control information from each identification device, a single control panel for one target device may be populated or "built up" with buttons, switches, slides, or other input mechanisms associated with respective parameters of the same target device. For example, computing device 12 may obtain, from identification device 24A, control information 26A that identifies one or more parameters that at least partially defines operation of a target device. Computing device 12 may also obtain, from identification device 24B, control information 26B that identifies one or more additional parameters that also at least partially define operation of the same target device. Responsive to obtaining control information 26B, computing device 12 may be configured to update the control panel to include the one or more parameters identified by control information 26B.

In this manner, computing device 12 may build up or add to a control panel with parameters identified by additionally obtained control information. In one example, control information 26A may identify a volume control parameter and control information 26B may identify a channel control parameter. Computing device 12 may add each of these parameters to the control panel in response to obtaining the respective control information. In some examples, each sub-panel may be associated with one or more respective parameters that define operation of the same target device.

Figure 4B:
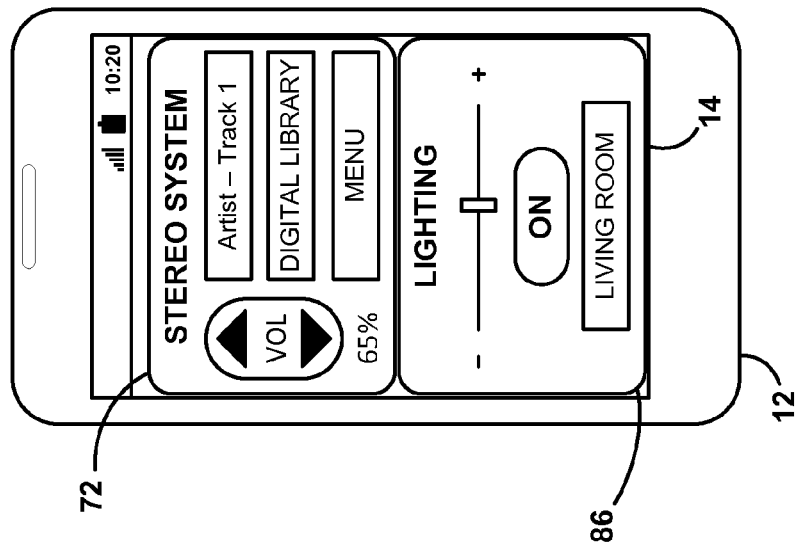
FIGS. 4A and 4B are conceptual diagrams illustrating an example user interface containing a spatial relationship between two control panels defined by a user.
Figure 4A:
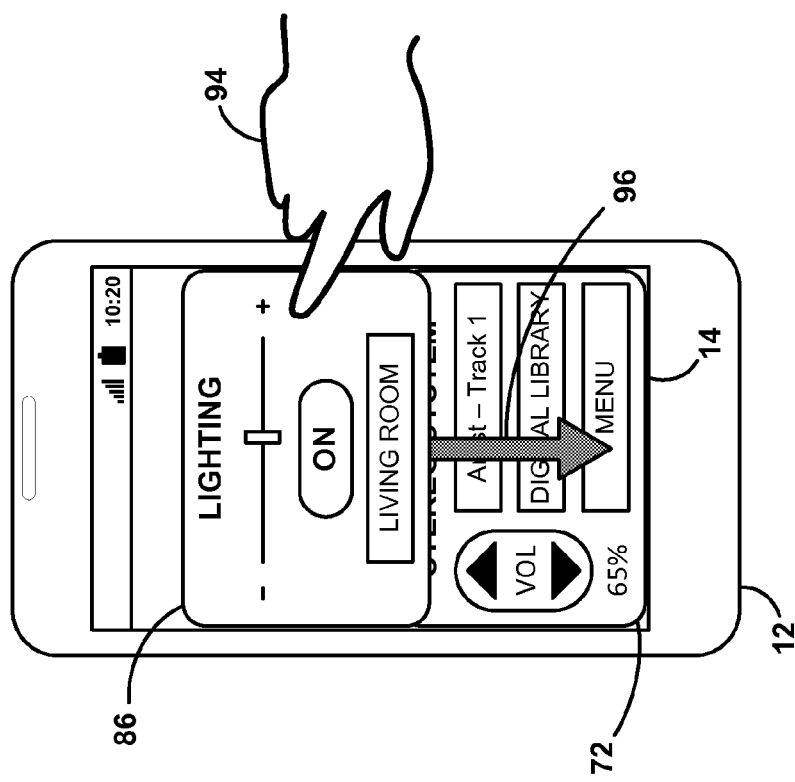

FIGS. 4A and 4B are conceptual diagrams illustrating example user interface 14 containing a spatial relationship between two control panels 72 and 86 defined by user 94. Control panels 72 and 86 are presented as examples for purposes of illustrating changes to the spatial relationship between control panels. As shown in FIG. 4A, user 94 desires to change the relationship between control panels 72 and 86. User 94 may perform this change by selecting a desired control panel and dragging the control panel to the desired location within user interface 14.

To select and move a control panel (e.g., control panel 86), user 94 may touch and hold any location of control panel 86 for a predetermined period of time (e.g., between approximately 0.5 seconds and 5 seconds). Once the predetermined period of time expires, user 94 may move control panel 86 to the desired location with respect to control panel 72. For example, user 94 may move control panel 96 in the direction of arrow 94 to define a new spatial relationship between the two control panels. As shown in FIG. 4B, control panel 86 has been moved to a new spatial relationship below that of control panel 72. Once user 94 releases the selected control panel, the control panels may be locked in their new positions until user 94 desired to once again move a control panel. In other examples, computing device 12 may be configured to provide control panels 72 and 86, side by side, at diagonal arrangements, or at any other user selectable arrangement.

In other examples, a user may move a control panel using different techniques. For example, the user may select a predetermined surface or area of the control panel and drag the predetermined surface until the respective control panel is moved to the desired location. In another example, a user may use multi-touch motions such as selecting two or more control panels with respective fingers and dragging each control panel until the control panels are positioned into the new spatial relationship with each other. Alternatively, user interface 14 may support scrolling motions, numerical inputs, or any other motions to trigger and/or move a desired control panel to create a new spatial relationship between two or more control panels.

Figure 5B:
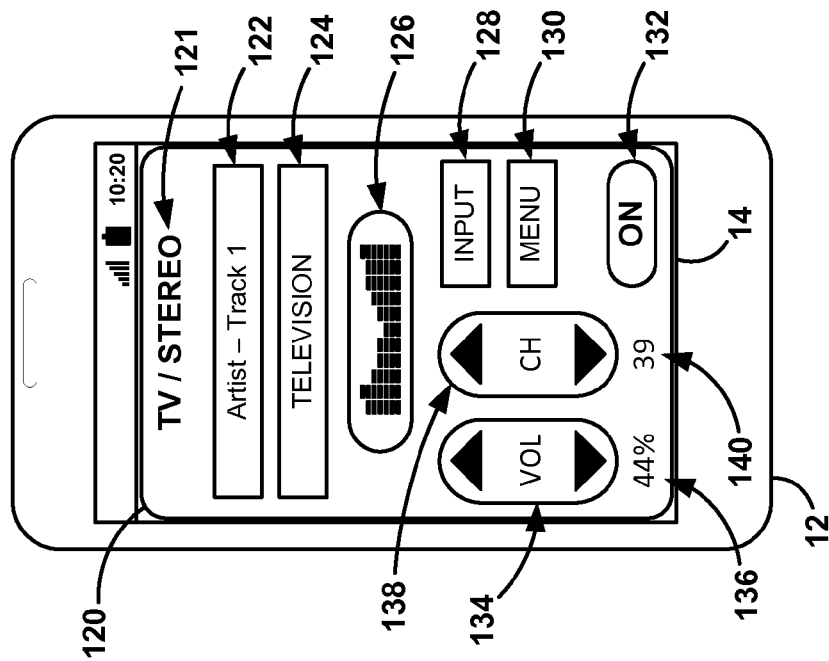
FIGS. 5A and 5B are conceptual diagrams illustrating example user interfaces containing common parameters of two target devices displayed in one or two control panels.
Figure 5A:
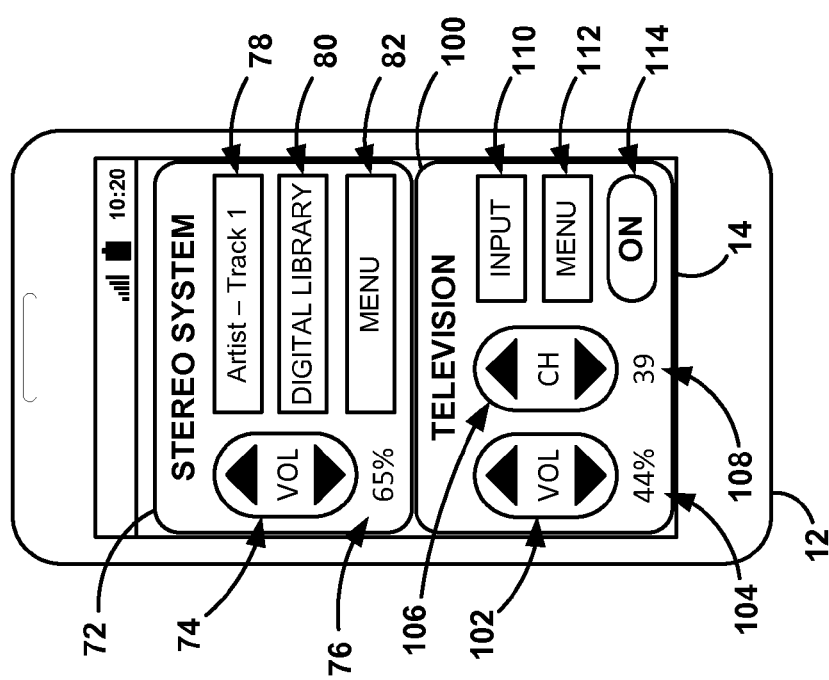

FIGS. 5A and 5B are conceptual diagrams illustrating example user interface 14 containing common parameters of two target devices displayed in one or two control panels. As shown in FIG. 5A, computing device 12 may display two or more control panels in response to obtaining control information 26. Control panel 72 may the same control panel described in FIG. 3. In addition, control panel 100 may be displayed. Control panel 100 may include volume input 102, volume value 104, channel input 106, channel value 108, input 110, menu 112, and power button 114. In this manner, control panels 72 and 100 may be stacked to each other.

Each of these items in control panel 100 may be an adjustment input that, when selected by the user, may be used to adjust the respective parameter. Volume input 102 may be an adjustment input for adjusting the volume of the television, and volume value 104 may indicate the current value of the volume parameter. Channel input 106 may be an adjustment input for adjusting the channel of the television, and channel value 108 may indicate the current channel of the channel parameter. Input 110 may allow the user to select the source from which the television may obtain audio and video information, menu 112 may allow the user to control additional parameters of the television not displayed in control panel 112, and power button 114 may allow the user to toggle between "ON" and "OFF." Each of input 110 and menu 112 may also present drop down menus or other inputs when selected.

As shown in FIG. 5B, computing device 12 may alternatively combine the different parameters from separate control panels to create one control panel 120. This combination may be used when each of the target devices may operate together in some circumstances. Indicator 121 indicates that control panel 120 includes parameters for two different target devices, a "TV" (or television) and a "Stereo" (or stereo system). Control panel 120 may include common parameters to each target device and separate parameters. For example, selection 122 (e.g., selection 78) and source 124 (e.g., source 124) may still be exclusive to the stereo system and thus retain separate inputs in control panel 120. In addition, input 128 may retain the separate input of input 110 in control panel 100. Channel input 138 and channel value 140 may also be similar to that of channel input 106 and channel value 108 of control panel 100. In some examples, the combined control panel 126 may include additional parameters such as equalizer input 126 for adjusting certain frequencies of the sound.

However, other parameters may be common parameters selected to adjust only one of the target devices or even common parameters mapped to adjust both target devices at once. For example, volume input 134 may be used as a common parameter of volume between both the television and the stereo system. If the stereo system is used to provide sound for the television, computing device 12 may identify volume as a common parameter and link volume input 134 for adjusting only the volume of the stereo system target device. In addition, computing device 12 may mute the television volume to prevent conflicting sound sources.

In other examples, other common parameters may be mapped so that a single input can be used to adjust the parameter of both target devices. For example, menu 130 may incorporate both menu 82 and menu 112 from control panels 72 and 100, respectively. When computing device 12 receives selection of menu 130, computing device 12 may present a pop-up menu or other screen where the user may navigate the menus of both target devices. In addition, power button 132 may be mapped to both target devices. Upon a single selection of power button 132, computing device 12 may control both target devices to turn "OFF" and "ON." Computing device 12 may also receive input customizing or configuring the parameters presented in control panel 120. These user configurations may also be stored so that computing device generates the same mapping and common parameters during the next instance in which computing device 12 has obtained control information for the same target devices.

Figure 6A:
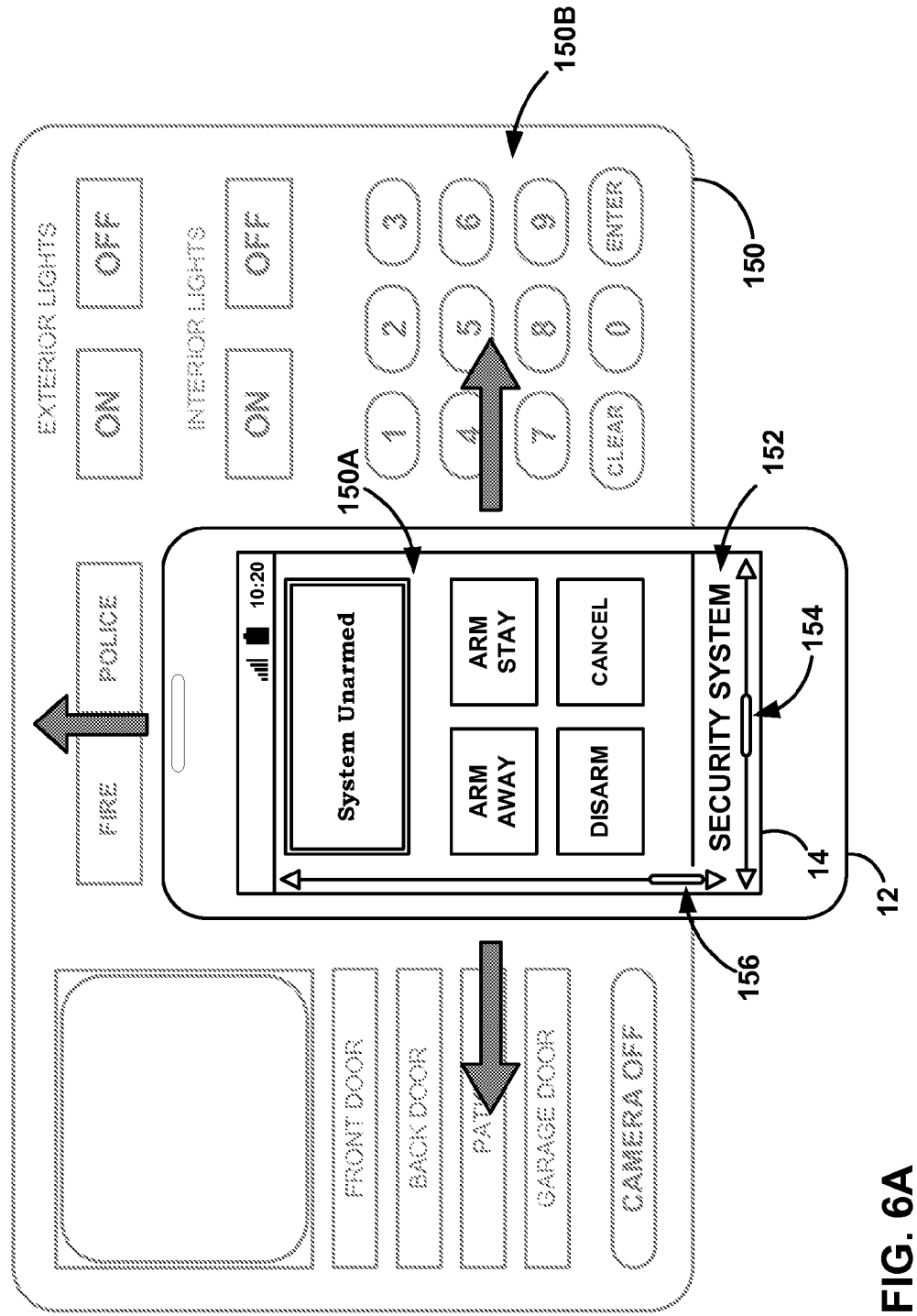
FIGS. 6A and 6B are conceptual diagrams illustrating an example user interface displaying a portion of an oversized control panel.
Figure 6B:
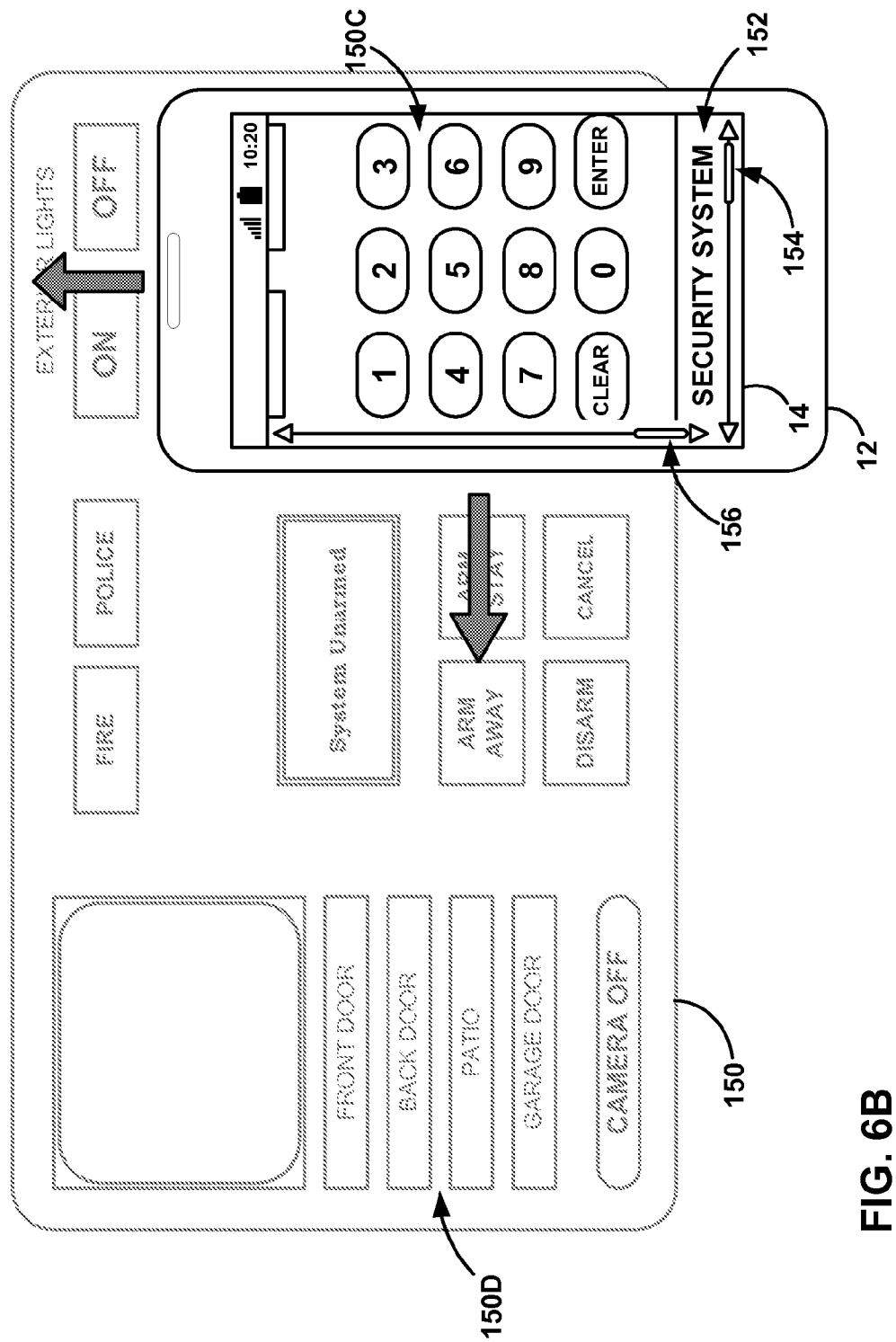

FIGS. 6A and 6B are conceptual diagrams illustrating an example user interface 14 displaying a portion of oversized control panel 150. As shown in FIGS. 6A and 6B, control panel 150 may be associated with control information 26 obtained by computing device 12. Control panel may include several parameters or configured in such a way that computing device 12 cannot display the entire control panel 150 at the same time. Since some computing devices 12 have displays of various sizes and resolutions, an oversized control panel 150 may occur when a computing device with a smaller screen size than intended for control panel 150 displays control panel 150. Alternatively, oversized control panel 150 may be provided deliberately such that the user may adjust several different parameters.

FIG. 6A provides computing device 12 positioned over a representation of control panel 150. User interface 14 may only display a portion (e.g., portion 150A) of control panel 150. The remainder portion of control panel (e.g., portion 150B), may not be displayed to the user. Instead, user interface 14 may generate different portions of control panel as computing device 12 is moved or control panel 150 is scrolled to a different portion. In other words, the grey or lighter colored portion 150B of FIG. 6A is provided for reference and is not displayed by computing device 12 is moved over a desired portion of portion 150B. Portion 150A may include a status screen and other commands for a security system (e.g., "Arm Away," "Arm Stay, "Disarm," and "Cancel"). In some examples, user interface 14 may initially display the last used portion of control panel 150 (e.g., the portion of control panel 150 presented by user interface 14 the last time control panel 150 was displayed) until computing device 12 is moved or control panel 150 is otherwise scrolled to a different portion.

Computing device 12 may display the first portion 150A based on user preferences or default configurations. For example, in response to obtaining control information 26, computing device 12 may display the geometric center of control panel 150 as portion 150A. Alternatively, computing device 12 may initially display the most used parameters of control panel 150 (as identified by the user or selected based on usage statistics) as portion 150A.

In some examples, computing device 12 may be moved in the direction of any arrows as desired by the user. Computing device 12 may detect the movement of computing device 12 with one or more sensors. Scroll indicators 154 and 156 may indicate to the user when the entire control panel 150 is not displayed on user interface 14. Scroll indicator 154 may indicate the horizontal position of portion 150A with respect to control panel 150 and scroll indicator 156 may indicate the vertical position of portion 150A with respect to control panel 150. In other examples, the user may touch and drag portion 150A to move to a different portion of control panel 150 or use one or more scroll inputs. Target device indicator 152 may indicate the specific target device 22 (e.g., a "Security System") associated with control panel 150.

As shown in FIG. 6B, the user has moved computing device 12 to a different portion of control panel 150. Now, portion 150C includes number pad inputs for target device 22. The remainder of control panel 150 that is not displayed by user interface 14 may be portion 150D. Between FIGS. 6A and 6B, the user may have merely moved computing device 12 in space. Computing device 12 may have detected the movement with one or more sensors and scrolled through control panel 150 accordingly. Control panel 150 may be moved in a direction opposite that of the movement to simulate moving computing device 12 to a different location in control panel 150. In other words, computing device 12 may move control panel 150 to the left when computing device 12 is moved to the right. Scroll indicators 154 and 156 may be updated based on the movement of computing device 12 as well.

Figure 7:
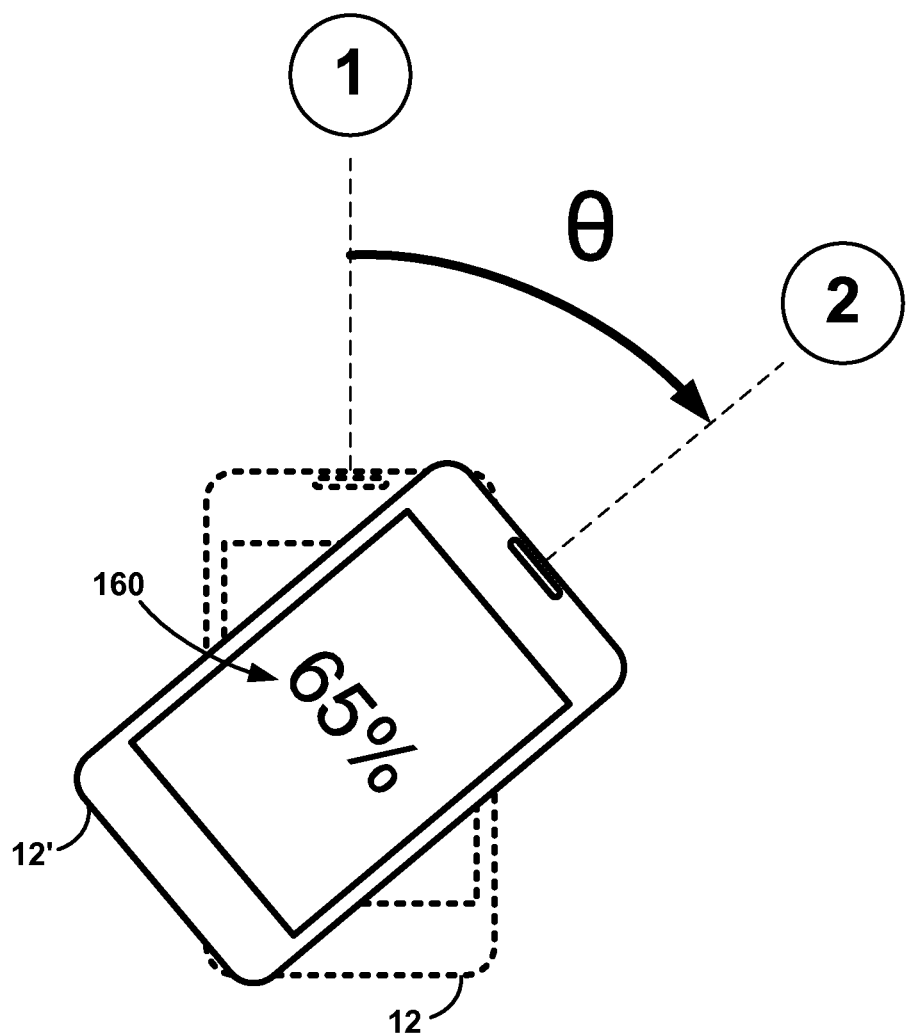
FIG. 7 is a conceptual diagram illustrating an example of rotational movement of a computing device to adjust a parameter of a target device.

FIG. 7 is a conceptual diagram illustrating an example of rotational movement of computing device 12 to adjust a parameter of target device 22. As described herein, many different movements of computing device 12 may be detected and used to adjust the parameter value for controlling target device 22. As shown in the example of FIG. 7, a sensor may detect rotation (or tilt) of computing device 12. Computing device 12 may detect a tilt angle θ between a first measurement (e.g., at position 1) and a second measurement (e.g., at position 2) from the sensor. In other words, computing device 12 is oriented at position 1 and computing device 12' is oriented at position 2. The tilt angle θ may be a measure of the rotation of computing device 12 about an axis orthogonal to user interface 14 (e.g., into the page of FIG. 7). This tilt angle θ may simulate adjustment of an analog dial or similar input mechanism for controlling a device.

The first measurement at position 1 may be taken upon obtaining control information 26 or otherwise receiving an input from the user indicating the adjustment is to begin. The first measurement may thus be the starting angle or reference angle for measuring the movement of computing device 12. The second measurement at position 2 may then be the latest, or most current, measurement from the sensor. The difference between the first and second measurements may thus be used to determine the tilt angle θ for adjusting the value of the parameter. Parameter value 160 is shown as presented by user interface 14. In the example of FIG. 7, parameter value 160 may have changed from 50% (not shown) at position 2 to 65% at position 2 (shown). Tilt angle θ may thus correspond to a 15% increase in the value of parameter 60 (e.g., volume).

Tilt angle θ may be the angle between the beginning and end of the adjustment to parameter 60. Alternatively, two or more tilt angles may be calculated in the interim as computing device 12 is rotated between position 1 and position 2. In any case, computing device 12 may detect movement of computing device 12 as computing device is rotated and transmit the detected movement to remote server 18. Rotation in one direction (e.g., clockwise) may increase the value of the parameter while rotation in another direction (e.g., counter-clockwise) may decrease the value of the parameter. The specific direction of movement required to increase or decrease the parameter may be selected by the user or preset by control information 26 and/or parameter information received from remote sever 18. Computing device 12 may continue to be rotated clockwise or counter-clockwise. However, computing device 12 may receive a clutch input from the user to allow adjustment of the parameter using only a limited rotational angle (e.g., angles limited by rotating a human wrist).

The magnitude of the adjustment may be mapped to the magnitude of the detected tilt angle θ. For example, one degree of tilt angle θ may correspond to a one percent adjustment in the value of the parameter. However, this sensitivity may be adjusted such that one degree of tilt angle θ corresponds to less than one percent of an adjustment or more than one percent of adjustment. The tilt angle θ may also correspond to absolute values of the parameter, e.g., decibels of a volume or a television channel) in other examples.

The available rotation, or maximum tilt angle θ, to adjust the parameter may be referred to as an adjustment range. The adjustment range may be set to a predetermined degree of rotation based on how much the user can rotate computing device 12 and/or a sensitivity for adjusting the parameter. In one example, the adjustment range may cover a 180-degree rotation. When computing device 12 is vertical, the value of the parameter is set to the current value when control information 26 was received. Rotating computing device 12 90 degrees clockwise may increase the parameter to the maximum value of the range while rotating computing device 12 90 degrees counter-clockwise may decrease the parameter to the minimum value of the range. The adjustment range may alternatively be set to 90 degrees, 120 degrees, 360 degrees, or even greater than 360 degrees of rotation. When the adjustment range is used to limit the amount of rotation needed, remote server 18 may scale tilt angle θ to the remaining possible adjustment of the parameter value. In other examples, the adjustment range for the tilt angle may be set based on the value of the parameter and the available adjustment of the value.

The sensitivity of the change to the parameter value for the detected movement may be stored by remote database 20. In addition, the range of the available tilt angle may be stored by remote database 20. In other examples, the sensitivity and/or range of the parameter may be stored by computing device 12. In addition, the rate of parameter value change may be adaptive based on the speed of rotation in other examples.

Instead of adjusting a parameter value with the rotation of computing device 12, computing device 12 may similarly detect rotation to change the portion of a control panel shown on user interface 14.

Figure 8:
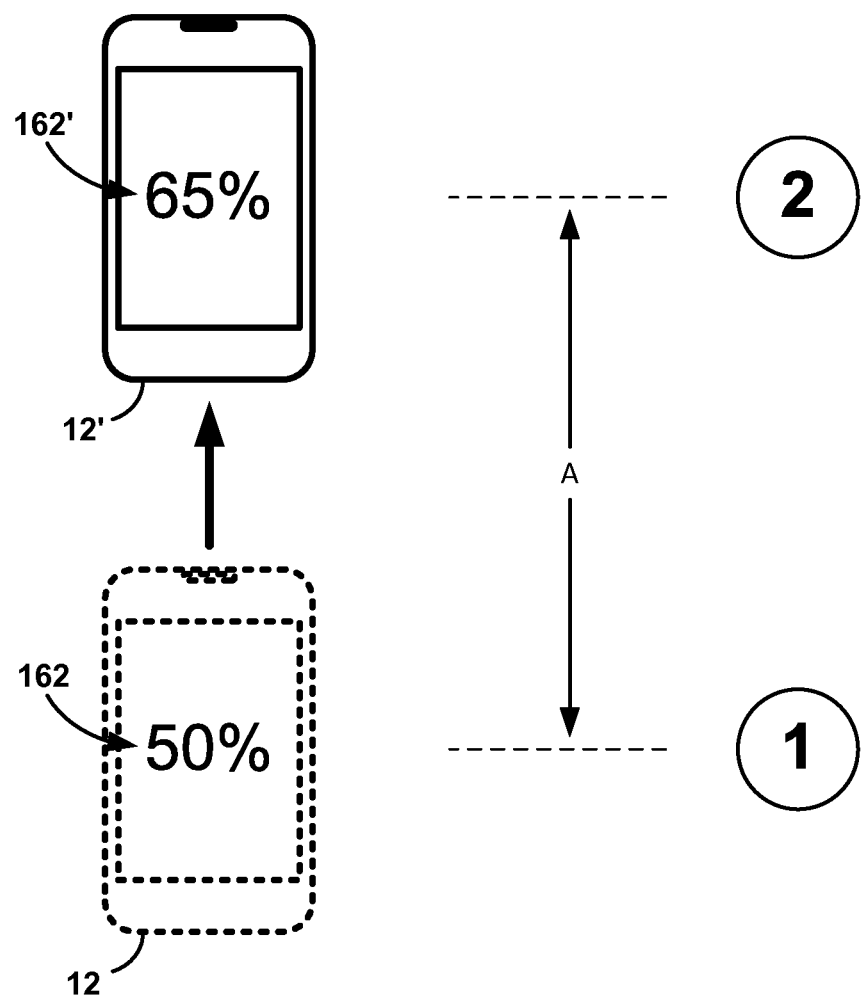
FIG. 8 is a conceptual diagram illustrating an example of linear movement of a computing device to adjust a parameter of a target device.

FIG. 8 is a conceptual diagram illustrating an example of linear movement of computing device 12 to adjust a parameter of target device 22. As described herein, many different movements of computing device 12 may be detected and used to adjust the parameter value for controlling target device 22. As shown in the example of FIG. 8, a sensor may detect linear movement of computing device 12. Computing device 12 may thus be capable of determining, or estimating, the distance A between location 1 and location 2. Distance A may be determined at any point in time and may be updated as computing device 12 is moved with respect to location 1. By determining distance A from identification device 24, computing device 12 and/or remote device 18 may be able to identify the movement of computing device 12 and the appropriate adjustment to the identified parameter value.

Location 1 may be the location of identification device 24. Although distance A between locations 1 and 2 of FIG. 8 may be a vertical distance, distance A may be in any direction from identification device 24. For example, computing device 12 may be moved in a diagonal direction or horizontal direction with respect to identification device 24 and distance A may still be measured in accordance to the direction in which computing device 12 has moved. However, opposing directions may be used to adjust the parameter value in opposite directions. For example, moving computing device 12 up may increase the value of the parameter and moving computing device 12 down may decrease the value of the parameter. Therefore, the movement detected by computing device 12 may have a direction component and a magnitude component. This directional component may also be able to use linear movement to adjust two or more parameters (e.g., vertical movement for one parameter and horizontal movement for a second parameter).

Computing device 12 may begin sensing and determining movement in response to obtaining control information 26 from identification device 24. In another example, computing device 12 may continuously sense and determine movement before and after obtaining control information 26. However, computing device 12 may only utilize the movement detected after obtaining the control information to update the movement of computing device 12. In other examples, computing device 12 may begin sensing and determining movement of computing device 12 when the clutch input is received. In another example, computing device 12 may change the detection rate (e.g., the rate of the sensor that senses the movement) in response to obtaining control information or after a predetermined period of time after obtaining the control information. For example, computing device 12 may increase the detection rate from a low detection to a high detection rate to provide a more accurate estimation of the physical movement of computing device 12.

As described herein, computing device 12 may use a sensor within computing device 12 to detect movement of computing device 12. Computing device 12 may then transmit the detected movement to a networked device (e.g., remote server 18). In one example, computing device 12 may include one or more accelerometers (e.g., accelerometer 53 of FIG. 2) that detect movement of computing device 12 by measuring accelerations of computing device 12 after obtaining control information 26 from identification device 24. After the accelerations are measured, computing device 12 may calculate a distance and a direction that computing device 12 was moved based on the measured accelerations. The accelerations may be measured with a two or three axis accelerometer or multiple accelerometers arranged orthogonally to each other. This acceleration measurement method may be referred to as an inertial measurement to interpolate the distance between two positions (e.g., position 1 and position 2).

The measured accelerations (e.g., sensor values obtained from the accelerometer sensor) may be used to measure the moved distance by double integrating the measured accelerations, for example. In the example of FIG. 8, the first measurement may be made at position 1 and the second measurement may be made at position 2. The distance may be calculated periodically and added to previously measured distances or calculated at a single time determined based on stopped movement or some other detected indication that the distance should be calculated. For example, the new position of computing device 12 may be determined in two dimensions in a plane parallel with user interface 14 of computing device 12. The following equation may be used to determine the new position of computing device 12:

$$\text{Distance}(X,Y) = \text{Distance}(\text{Integral}(\text{Integral}(AccX,t),t), \text{Integral}(\text{Integral}(AccY,t),t)). \quad (1)$$

Equation 1 illustrates the example method for determining the distance computing device 12 has moved by double integration of each X and Y directional component of the sensor output. X is the distance moved in the X direction and Y is the distance moved in the Y direction. AccX is the acceleration value in the X direction over time t and AccY is the acceleration value in the Y direction over time t. Distance A may correspond to Y in this example of FIG. 8. When each acceleration value is integrated twice and added to the previous, or old, position, the detected movement has been used to calculate or estimate the location of computing device 12. Either the X distance or Y distance, or both, may be used to calculate the appropriate adjustment to the identified parameter (e.g., parameter 162).

For example, computing device 12 at position 1 has a value of 50% for parameter 162. After computing device 12 has been moved vertically upward (e.g., computing device 12' at position 2), the value of parameter 162' has been adjusted to 65%. In other words, detected movement of distance A may correspond to a parameter change of approximately 15%. Moving computing device 12 further upward may further increase the parameter value. Conversely, moving computing device 12 downward may decrease the parameter value.

In some examples, computing device 12 may directly calculate movement of computing device 12 based on the acceleration measurements and transmit the calculated movement as movement information. Remote server 18 may then use the movement information to make the corresponding adjustment to the identified parameter from control information 26. In this manner, computing device 12 and remote server 18 may each contribute to calculating the movement of computing device 12. Alternatively, remote sever 18 may perform most of the calculations to determine movement of computing device 12. Computing device 12 may simply transmit sensed or measured values from the one or more accelerometers, and calibration information if necessary, to remote server 18. Remote server 18 may then calculate the distance and direction computing device 12 has moved and the adjusted value of the parameter. In any case, remote server 18 may use the newly calculated movement of computing device 12 to adjust the parameter value and transmit the adjusted value of the parameter to target device 22 and computing device 12 as parameter information.

The magnitude of the adjustment may be mapped to the magnitude of distance A. For example, one centimeter of movement may correspond to a five percent adjustment in the value of the parameter. However, this sensitivity may be adjusted such that one centimeter of linear movement corresponds to less than five percent of an adjustment or more than five percent of adjustment. The distance A may also correspond to absolute values of the parameter, e.g., decibels of a volume or a television channel) in other examples. In addition, the rate of parameter value change may be adaptive based on the speed of rotation in other examples.

The available movement, or maximum distance A, to adjust the parameter may be referred to as an adjustment range. The adjustment range may be set to a predetermined distance based on a reasonable distance to move computing device 12 and/or a sensitivity for adjusting the parameter. Generally, the adjustment range may be between approximately 2.0 centimeters and 100 centimeters. However, the adjustment range may be less than 2.0 centimeters or greater than 100 centimeters in other examples. In one example, the adjustment range may be approximately 40 centimeters. Moving computing device 12 up 20 centimeters may increase the parameter value to the maximum value of the parameter and moving computing device 20 centimeters down may decrease the parameter value to the minimum value of the parameter. When the adjustment range is used to limit the amount of movement needed, remote server 18 may scale distance A to the remaining possible adjustment of the parameter value. In other examples, the adjustment range for the linear movement may be set based on the value of the parameter and the available adjustment of the value or the amount of movement needed to reach all portions of an oversized control panel.

The sensitivity of the change to the parameter value for the detected movement may be stored by remote database 20. In addition, the range of the available movement distance may be stored by remote database 20. In other examples, the sensitivity and/or range of the parameter may be stored by computing device 12. In addition, the rate of parameter value change may be adaptive based on the speed of movement in other examples.

Instead of adjusting a parameter value with the rotation of computing device 12, computing device 12 may similarly detect linear movement to change the portion of a control panel shown on user interface 14. This movement may be similar to that described with respect to FIGS. 6A and 6B.

Figure 9:
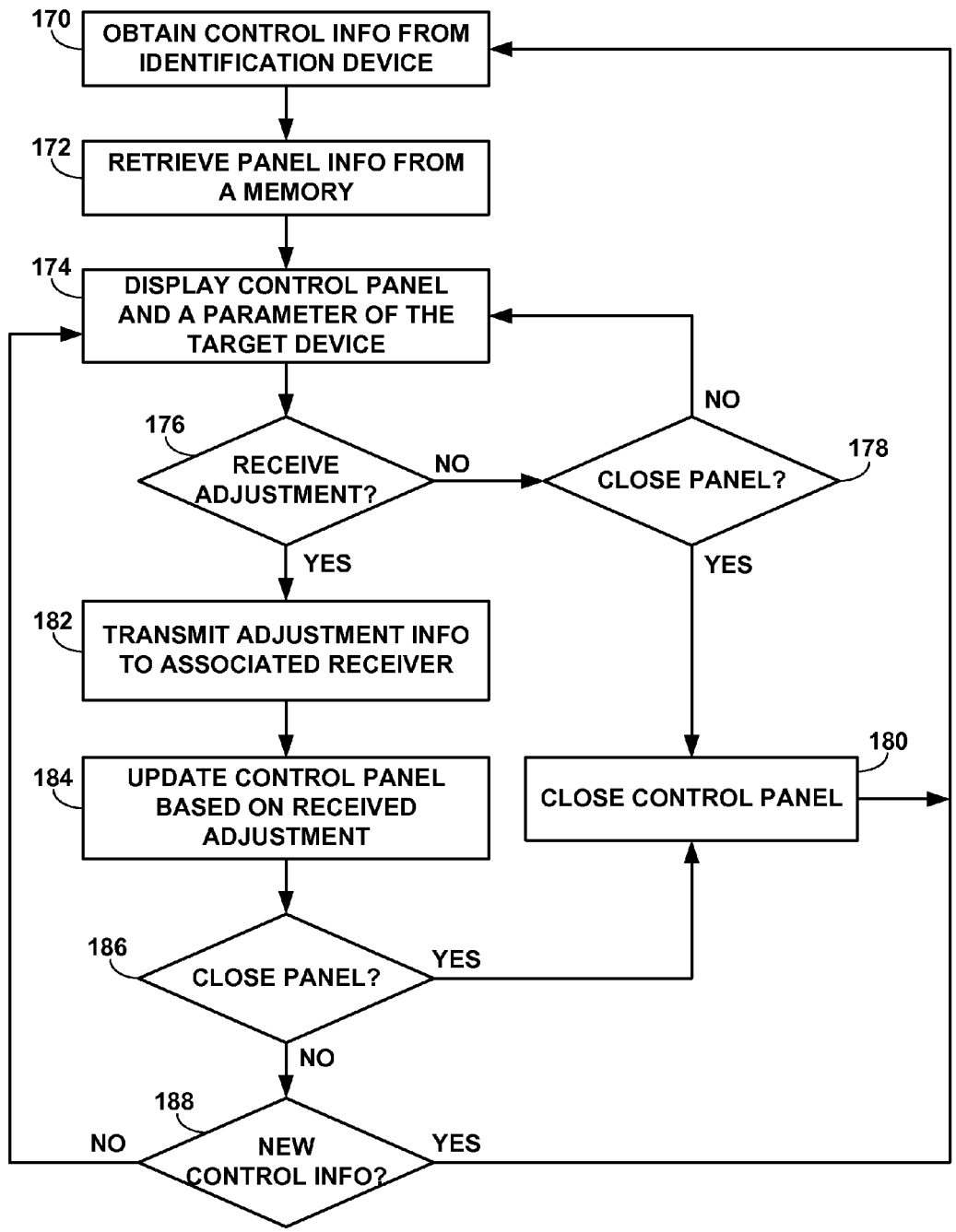
FIG. 9 is a flow diagram illustrating an example process that may be performed by a computing device to display a control panel based on control information obtained from an identification device.

FIG. 9 is a flow diagram illustrating an example process that may be performed by a computing device (e.g., computing device 12) to display a control panel based on control information obtained from an identification device (e.g., identification device 24). The process of FIG. 9 will be described below with respect to processor 40, but other processors, modules, applications, or any combination thereof, may perform the steps attributed to processor 40. In addition, FIG. 9 is described with regard to identification device 24 being an NFC device. However, identification device 24 may be another short-range communication device or even a visual indicator or optical code including a bar code, QR code, or other image representative of control information 26.

Using short-range communication device 54 (e.g., an NFC device), processor 40 may obtain control information 26 from identification device 24 when computing device 12 is placed proximate to identification device 24 (170). Once processor 40 obtains the control information 26, processor 40 may retrieve panel information from a memory (172). In some examples, processor 40 may retrieve panel information from memory 42 or storage devices 46 of computing device 12. In other examples, computing device 12 may retrieve panel information from remote database 20 via remote server 18. In any example, panel information may define at least part of the control panel displayed on computing device 12 and include at least one parameter to be adjusted for target device 22. Processor 40 may then control user interface 14 to display the control panel and at least one parameter of target device 22 in the control panel (174).

If processor 40 does not receive an adjustment input associated with the control panel ("NO" branch of block 176) and no command to close the control panel has been received ("NO" branch of block 178), processor 40 may continue to display the control panel (174). If processor 40 does receive a command to close the control panel ("YES" branch of block 178), processor 40 may close the control panel (180). If processor 40 receives an adjustment input ("YES" branch of block 176), processor 40 may transmit adjustment information to the associated receiver 28 (182). The adjustment information may include a reference or instruction representative of the adjustment input received (e.g., an adjustment input via the control panel or a detected movement of computing device 12). Receiver 28 may be directly associated with target device 22 or used as an access point to remote server 18 via network 16. Processor 40 may then update the control panel based on the received adjustment (184). The update may be changing the value of the displayed parameter in the control panel.

If processor 40 does receive a command to close the control panel ("YES" branch of block 186), processor 40 may close the control panel (180). If processor 40 does not receive a command to close the control panel ("NO" branch of block 186), processor 40 may check for new control information (188). If processor 40 does not detect new control information ("NO" branch of block 188), processor 40 may continue to display the current control panel (174). If processor 40 does detect new control information ("YES" branch of block 188), processor 40 may obtain new control information from the respective identification device (170).

Figure 10:
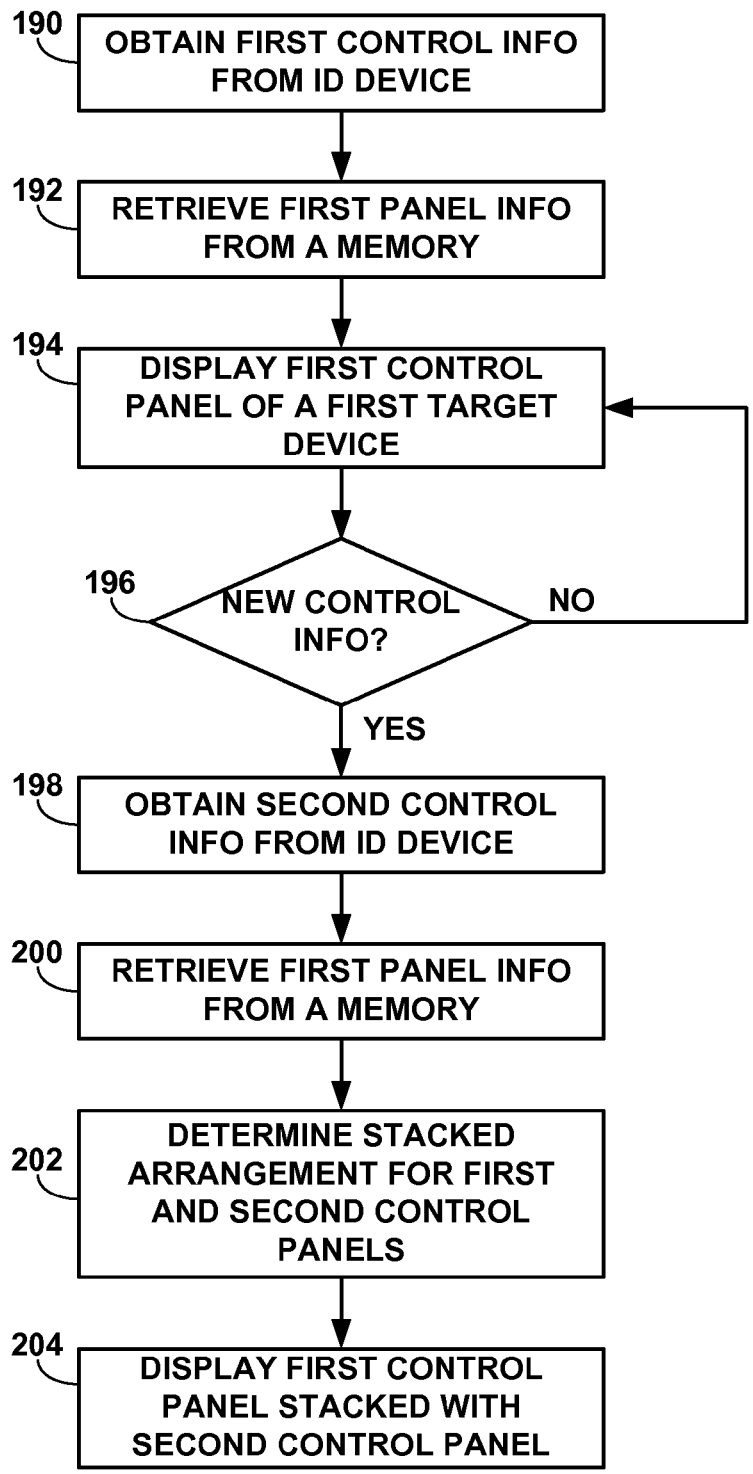
FIG. 10 is a flow diagram illustrating an example process that may be performed by a computing device to stack two control panels based on control information obtained from two identification devices.

FIG. 10 is a flow diagram illustrating an example process that may be performed by a computing device (e.g., computing device 12) to stack two control panels based on control information obtained from two identification devices (e.g., different identification devices 24). The process of FIG. 10 will be described below with respect to processor 40, but other processors, modules, applications, or any combination thereof, may perform the steps attributed to processor 40. In addition, FIG. 10 is described with regard to identification devices 24 (e.g., identification devices 24A and 24B of FIG. 3) being NFC devices. However, identification devices 24 may be another short-range communication device or even a visual indicator or optical code including a bar code, QR code, or other image representative of control information 26.

Using short-range communication device 54 (e.g., an NFC device), processor 40 may obtain first control information 26A from identification device 24A when computing device 12 is placed proximate to identification device 24A (190). Once processor 40 obtains the control information 26A, processor 40 may retrieve first panel information from a memory (192). As described herein, processor 40 may retrieve panel information from memory 42 or storage devices 46 of computing device 12 or remote database 20 via remote server 18. In any example, the first panel information may define at least part of the first control panel displayed on computing device 12 and include at least one parameter to be adjusted for a first target device. Processor 40 may then control user interface 14 to display the first control panel and at least one parameter of the first target device in the first control panel (194).

If processor 40 does detect additional control information ("NO" branch of block 196), processor 40 may continue to display the first control panel (194). In response to obtaining additional control information 26B ("YES" branch of block 196), processor 40 may use short-range communication device 54 to obtain second control information 26B from the identification device 24B (198). Once processor 40 obtains the control information 26B, processor 40 may retrieve second panel information from a memory (200). Processor 40 may then manage the two control panels. Processor 40 may determine the stacked arrangement for the first and second control panels to be displayed by user interface 14 (202). For example, processor 40 may use one or more instructions stored in a memory to determine the spatial relationship between the two control panels in the stacked configuration. Processor 40 then displays the first control panel stacked with the second control panel (204).

In some examples, processor 40 may continue to stack additional control panels as long as the user does not close a control panel. Processor 40 may take different actions upon obtaining additional control information in other examples. In one example, processor 40 may replace the current control panel with the new control panel of the most recently obtained control information. In another example, processor 40 may merge the parameters of the two control panels with separate parameters or even common parameters with single inputs.

Figure 11:
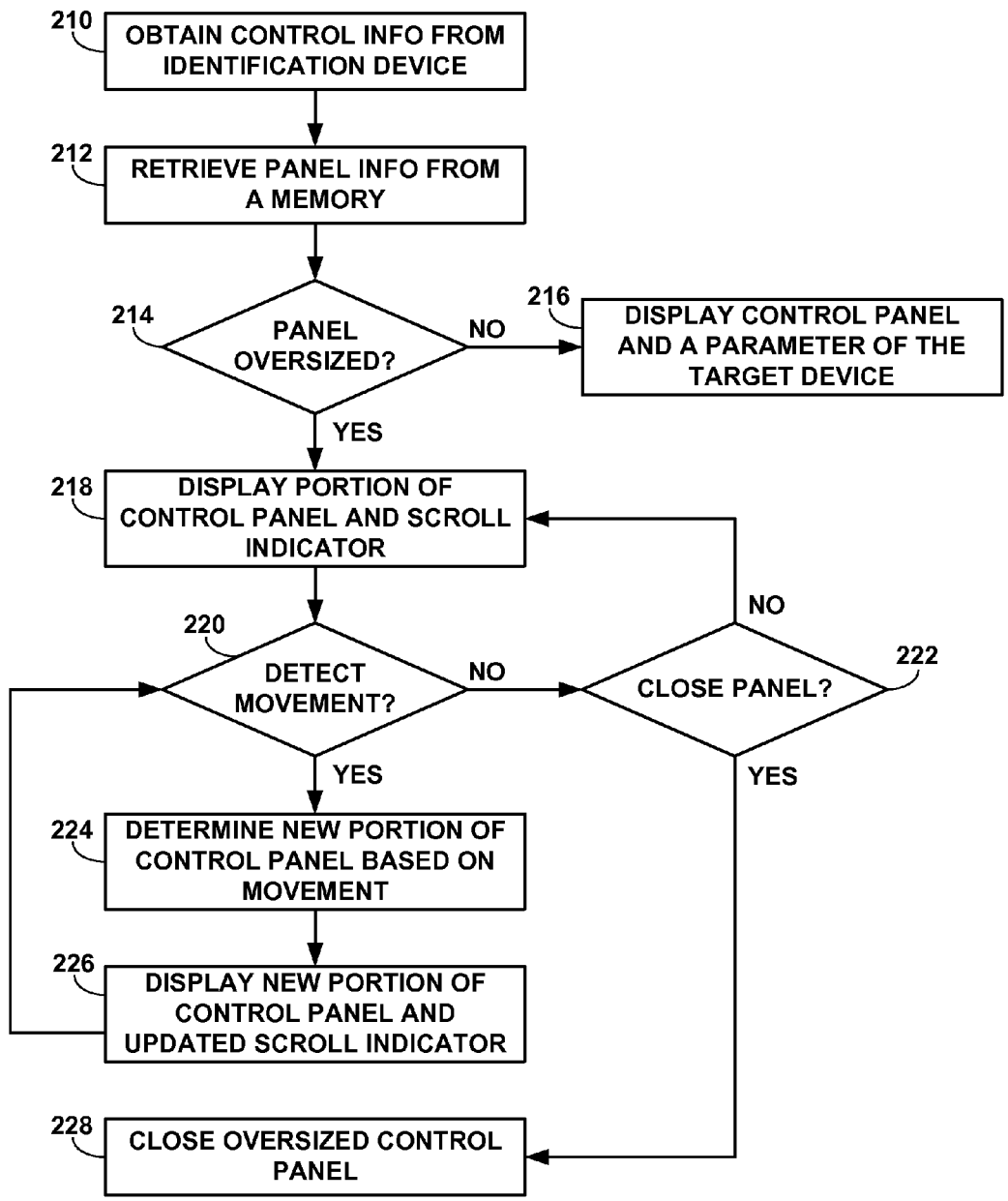
FIG. 11 is a flow diagram illustrating an example process that may be performed by a computing device to display a portion of an oversized control panel and adjust the displayed portion based on detected movement of the computing device.

FIG. 11 is a flow diagram illustrating an example process that may be performed by a computing device (e.g., computing device 12) to display a portion of an oversized control panel and adjust the displayed portion based on detected movement of computing device 12. The process of FIG. 11 will be described below with respect to processor 40, but other processors, modules, applications, or any combination thereof, may perform the steps attributed to processor 40. Although the movement detection described in FIG. 11 is described with regard to accelerometer 53, other sensors such as compasses, gyroscopes, and optical sensors may be used instead to calculate the distance and direction computing device 12 has moved. In addition, FIG. 11 is described with regard to identification device 24 being an NFC device. However, identification device 24 may be another short-range communication device or even a visual indicator or optical code including a bar code, QR code, or other image representative of control information 26.

Using short-range communication device 54 (e.g., an NFC device), processor 40 may obtain first control information 26 from identification device 24 when computing device 12 is placed proximate to identification device 24 (210). Once processor 40 obtains the control information 26, processor 40 may retrieve panel information from a memory (212). If processor 40 determines that the control panel will fit entirely within the display of user interface 14 ("NO" branch of block 214), processor 40 may control user interface 14 to display the control panel of at least one parameter of target device 22 (216).

In response to determining that the control panel will be oversized for user interface 14 ("YES" branch of block 214), processor 40 may determine which portion of the control panel to display first and display the control panel (218). In addition to displaying the portion of the control panel, processor 40 may display one or more scroll indicators that indicate where the displayed portion of the control panel is with respect to remaining non-displayed portions of the control panel.

If processor 40 does not detect any movement of computing device 12 via accelerometer 53 ("NO" branch of block 220), processor 40 may determine if the control panel should be closed (e.g., processor 40 has received input closing the control panel for target device 22) (222). If the control panel is to be closed ("YES" branch of block 222), processor 40 may close the oversized control panel for target device 22 (228). If the control panel is to remain open ("NO" branch of block 222), processor 40 may continue to display a portion of the oversized control panel (218).

In response to processor 40 detecting movement of computing device 12 based on a change in output from accelerometer 53 ("YES" branch of block 220), processor 40 determines the new portion of the oversized control panel to be displayed based on the detected movement (224). For example, processor 40 may measure accelerations of computing device 12 using accelerometer 53. Using the acceleration values, processor 40 may calculate the distance computing device 12 has moved by double integrating the measured accelerations. Processor 40 may also calculate the direction computing device 12 has moved by determining the vector based on direction components of the distance values. Alternatively, processor 40 may calculate the direction of movement by taking a single integration of the acceleration values and using the velocity vector. Although this technique is described with regard to linear movement of computing device 12, rotational movement may similarly be detected as described herein. Processor 40 may scale the distance of the movement to correspond to an appropriate translation or scroll of the oversized control panel in the opposite direction of the movement.

Once processor 40 determines the new portion of the oversized control panel to be displayed (224), processor 40 may command user interface 14 to display the new portion of the control panel and update the scroll indicators (226). Processor 40 may then continue to detect movement of computing device 12 for further adjustments to the displayed portion of the control panel.

Figure 12:
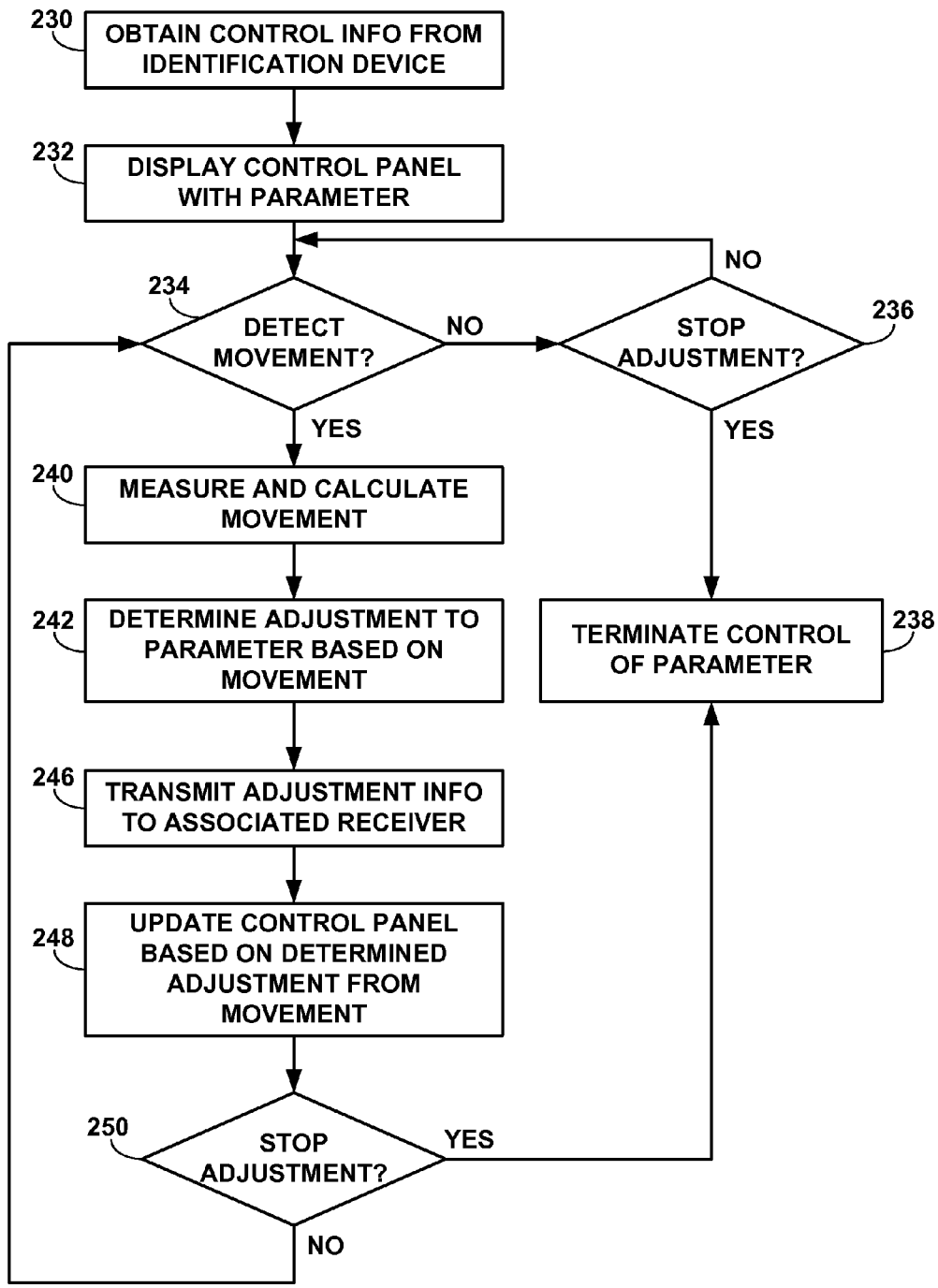
FIG. 12 is a flow diagram illustrating an example process that may be performed by a computing device to display a control panel and adjust a parameter of the control panel based on detected movement of the computing device.

FIG. 12 is a flow diagram illustrating an example process that may be performed by a computing device (e.g., computing device 12) to display a control panel and adjust a parameter of the control panel based on detected movement of computing device 12. The process of FIG. 12 will be described below with respect to processor 40, but other processors, modules, applications, or any combination thereof, may perform the steps attributed to processor 40. Although the movement detection described in FIG. 12 is described with regard to accelerometer 53, other sensors such as compasses, gyroscopes, and optical sensors may be used instead to calculate the distance and direction computing device 12 has moved (e.g., with respect to identification device 24 and/or the Earth's surface). In addition, FIG. 12 is described with regard to identification device 24 being an NFC device. However, identification device 24 may be another short-range communication device or even a visual indicator or optical code including a bar code, QR code, or other image representative of control information 26.

Using short-range communication device 54 (e.g., an NFC device), processor 40 may obtain control information 26 from identification device 24 when computing device 12 is placed proximate to identification device 24 (230). Once processor 40 obtains the control information 26, processor 40 may command user interface 14 to display the control panel with the desired parameter of target device 22 (232). The operation of detecting movement may, in some examples, overlap with the operation of displaying the control panel or other operations.

If processor 40 does not detect any movement of computing device 12 via accelerometer 53 ("NO" branch of block 234), processor 40 may determine if the adjustment of the parameter should be stopped (e.g., processor 40 has received input terminating movement control of the parameter) (236). If the parameter adjustment is to be stopped ("YES" branch of block 236), processor 40 may terminate control of the parameter using detected movement of computing device 12 (238). In other words, the user may select when the detected movement is used to adjust the parameter and/or the adjustment period may be a time period that causes termination of adjustment once the time period expires. If the parameter adjustment is to be continued ("NO" branch of block 236), processor 40 may continue to detect movement of computing device 12 (234).

If processor 40 detects movement of computing device 12 based on a change in output from accelerometer 53 ("YES" branch of block 234), processor 40 may measure accelerations of computing device 12 (240). Processor 40 may command accelerometer 53 to begin sensing accelerations or processor 40 may begin accessing accelerometer data to measure the accelerations. Using the acceleration values, processor 40 may calculate the distance computing device 12 has moved by double integrating the measured accelerations. Processor 40 may also calculate the direction computing device 12 has moved by determining the vector based on direction components of the distance values. Alternatively, processor 40 may calculate the direction of movement by taking a single integration of the acceleration values and using the velocity vector. Although this technique is described with regard to linear movement of computing device 12, rotational movement may similarly be detected as described herein.

Once the distance and direction of movement has been calculated, processor 40 may determine the adjustment to be made to the parameter based on the detected movement (242). Computing device 12 may employ one or more equations or lookup tables to determine the adjustment from the detected movement. Computing device 12 may also generate adjustment information suitable for controlling target device 22 using the determined adjustment. Processor 40 may then transmit the adjustment information to receiver 28 associated with target device 22 (246). In one example, receiver 28 may be directly coupled to target device 22. In other examples, receiver may be an access point for network 16 and remote server 18. In this manner, computing device 12 or remote server 18 may command adjustments to a parameter of target device 22. Processor 40 may then update the control panel and the respective value of the parameter based on the determined adjustment from the detected movement (248). For example, the adjusted value may be presented on screen 82 of FIG. 5.

If processor 40 receives a command to stop the adjustment of the parameter ("YES" branch of block 250), processor 40 may terminate the movement control of the parameter (238). However, terminating the movement control of the parameter may not close the control panel. If processor 40 does not receive a command to stop adjusting the parameter value ("NO" branch of block 250), processor 40 continue to detect movement for adjusting the parameter (234).

Remote server 18 may communicate with target device 22 via network 16 to adjust the parameter value based on the detected movement of computing device 12. In other examples, remote server 18 may communicate with target device 22 via a different network or using a direct communication pathway other than a network. Alternatively, computing device 12 may directly control target device 22 (e.g., adjust the parameter based on physical movements of computing device 12). Computing device 12 may transmit adjustments to the parameter value via network 16. In other examples, computing device 12 may use infrared communication, radio frequency communication, or other direct communication protocol to adjust the value of the parameter based on control information 26 and the detected movement of computing device 12. Each of these communication pathways may utilize type of receiver 28.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Example computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:

1. A method comprising:
   obtaining, by a computing device, first control information from a first identification device located remotely from a first target device, wherein the first control information is associated with the first target device;
   responsive to obtaining the first control information, displaying a control panel at a display, wherein the control panel comprises at least a first parameter that at least partially defines operation of the first target device;
   obtaining, by the computing device, second control information from a second identification device located remotely from a second target device, wherein the second control information is associated with the second target device;
   responsive to obtaining the second control information, updating the control panel to comprise at least a second parameter that at least partially defines operation of the second target device;
   receiving, by the computing device, an adjustment to at least one of the first parameter and the second parameter of the control panel; and
   responsive to receiving the adjustment, transmitting adjustment information to a receiver associated with at least one of the first target device and the second target device, wherein the adjustment information is representative of the adjustment.

2. The method of claim 1, wherein:
   updating the control panel comprises displaying a first control sub-panel and a second control sub-panel at the display; and
   the first control sub-panel comprises at least the first parameter that at least partially defines operation of the first target device and the second control sub-panel comprises at least the second parameter that at least partially defines operation of the second target device.

3. The method of claim 2, wherein displaying the first control sub-panel and the second control sub-panel comprises displaying the first control sub-panel adjacent to the second control sub-panel at the display.

4. The method of claim 2, further comprising:
   receiving an indication of a touch input that defines a spatial relationship between the first control sub-panel and the second control sub-panel at the display.

5. The method of claim 1, further comprising:
   comparing a plurality of parameters associated with the first target device and a plurality of parameters associated with the second target device;
   identifying at least one parameter common to both the first target device and the second target device;
   selecting one of the first target device or the second target device to be controlled with the common parameter; and
   displaying the common parameter on the control panel.

6. The method of claim 1, further comprising:
   identifying a parameter common to both the first target device and the second target device;
   mapping a single input mechanism to the common parameter for each of the first target device and the second target device; and
   displaying the single input mechanism on the control panel.

7. The method of claim 1, wherein the control panel is a first control panel associated with at least one of the first target device and the second target device, and wherein the method further comprises:
   responsive to obtaining control information from a third identification device located remotely from a third target device, replacing the first control panel with a second control panel associated with the third target device.

8. The method of claim 1, further comprising:
   subsequent to obtaining the first control information, obtaining third control information from a third identification device located remote from the first target device, wherein the first control information identifies the first parameter that at least partially defines operation of the first target device and the third control information identifies a third parameter that at least partially defines operation of the first target device; and
   responsive to obtaining the third control information, updating the control panel to include the third parameter in addition to the first parameter.

9. The method of claim 1, wherein displaying the control panel comprises displaying a first portion of the control panel, further comprising:
   detecting movement of the computing device in a first direction, and, responsive to the movement, scrolling the control panel in a second direction opposite the first direction to display a second portion of the control panel.

10. The method of claim 1, wherein receiving the adjustment to at least one of the first parameter and the second parameter of the control panel comprises receiving an adjustment input via the control panel at the display.

11. The method of claim 1, wherein receiving the adjustment to at least one of the first parameter and the second parameter of the control panel comprises:
    detecting, by a sensor of the computing device, movement of the computing device; and
    determining the adjustment to at least one of the first parameter and the second parameter as a function of the detected movement.

12. The method of claim 1, wherein displaying the control panel further comprises:
    configuring at least one of the first parameter and the second parameter of the control panel based on a set of user preferences; and
    displaying the control panel according to the configuration.

13. The method of claim 1, wherein displaying the control panel comprises displaying the control panel when the computing device is in a passcode locked state.

14. The method of claim 1, wherein displaying the control panel comprises:
    responsive to obtaining the first control information, presenting a passcode input screen at the display of the computing device;
    receiving a passcode input from a user via the passcode input screen; and
    responsive to receiving the passcode input, displaying the control panel at the display.

15. The method of claim 1, wherein the first control information is encrypted, further comprising:
    decrypting, by the computing device, the first control information prior to displaying the control panel.

16. The method of claim 1, wherein the receiver is a part of a network access point that communicates the adjustment to a networked device via a network, and wherein the networked device controls at least one of the first target device and the second target device according to the adjustment.

17. The method of claim 1, wherein:
    at least one of the first control information and the second control information comprises a uniform resource identifier configured to direct a browser of the computing device to a web-based service associated with the networked device; and
    the uniform resource identifier comprises a code that identifies at least one of the first parameter and the second parameter and one of the respective first target device and second target device.

18. The method of claim 1, further comprising:
    responsive to obtaining the first control information, launching, by the computing device, a control application that executes on the computing device, wherein the control application at least partially manages the control panel.

19. The method of claim 1, wherein obtaining at least one of the first control information and the second control information from the respective first identification device or second identification device comprises obtaining the at least one of first control information and second control information via near-field communication.

20. The method of claim 1, wherein obtaining at least one of the first control information and the second control information from the respective first identification device or second identification device comprises obtaining the at least one of first control information and second control information from an optical code of the respective first identification device or second identification device.

21. The method of claim 1, wherein the at least one of the first parameter and the second parameter of the control panel is one of a volume control, a channel control, a light intensity control, a temperature control, a security system control, a motor control, a fan control, a timer, or a toggle control.

22. The method of claim 1, wherein at least one of the first target device and the second target device is one of a media system, a lighting system, a sound system, a heating system, or a security system.

23. The method of claim 1, wherein the computing device is a mobile computing device.

24. A computer-readable storage device encoded with instructions that cause one or more processors of a computing device to perform operations comprising:
    obtaining first control information from a first identification device located remotely from a first target device, wherein the first control information is associated with the target device;
    responsive to obtaining the first control information, displaying a control panel at a display, wherein the control panel comprises at least a first parameter that at least partially defines operation of the first target device;
    obtaining second control information from a second identification device located remotely from a second target device, wherein the second control information is associated with the second target device;
    responsive to obtaining the second control information, updating the control panel to comprise at least a second parameter that at least partially defines operation of the second target device;
    receiving an adjustment to at least one of the first parameter and the second parameter of the control panel; and
    responsive to receiving the adjustment, transmitting adjustment information to a receiver associated with at least one of the first target device and the second target device, wherein the adjustment information is representative of the adjustment.

25. A mobile computing device comprising:
    a near-field communication module configured to:
        obtain first control information from a first identification device located remotely from a first target device, wherein the first control information is associated with the first target device; and
        obtain second control information from a second identification device located remotely from a second target device, wherein the second control information is associated with the second target device; and
    a processor configured to:
        responsive to obtaining the first control information, display a control panel at a display of the mobile computing device, wherein the control panel comprises at least a first parameter that at least partially defines operation of the first target device;
        responsive to obtaining the second control information, update the control panel to comprise at least a second parameter that at least partially defines operation of the second target device;
        receive an adjustment to at least one of the first parameter and the second parameter of the control panel; and
        responsive to receiving the adjustment, transmit adjustment information to a receiver associated with at least one of the first target device and the second target device, wherein the adjustment information is representative of the adjustment.

* * * * *